Dec. 20, 1949  J. DOLZA ET AL  2,491,482
ENGINE CONTROLLER
Filed Feb. 3, 1944  12 Sheets-Sheet 1

Inventors
John Dolza
Arthur W. Gaubatz
Peter W. Perish
Frank W. Kerfoot
by Spencer Hardman & Fehr
their Attorneys

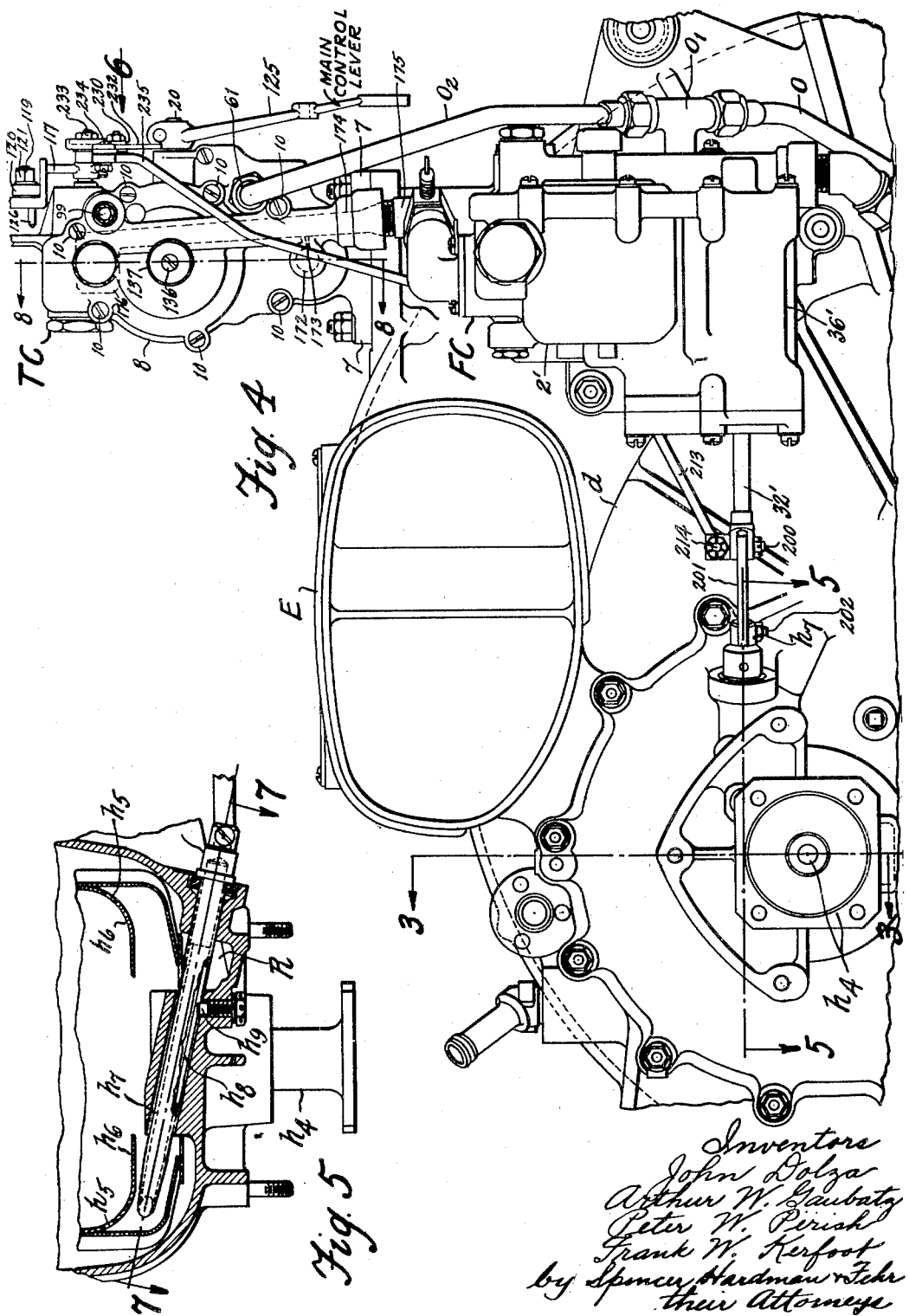

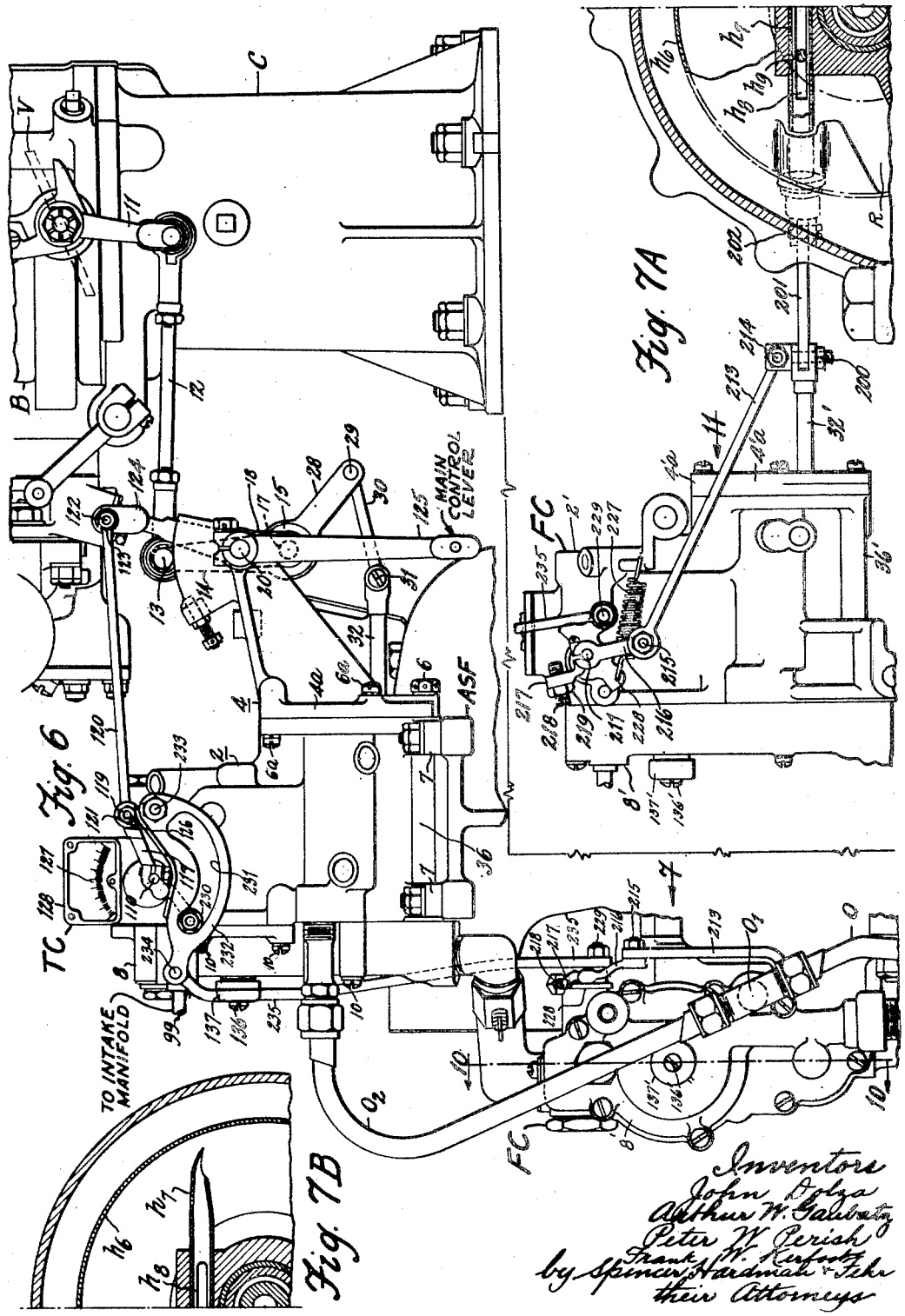

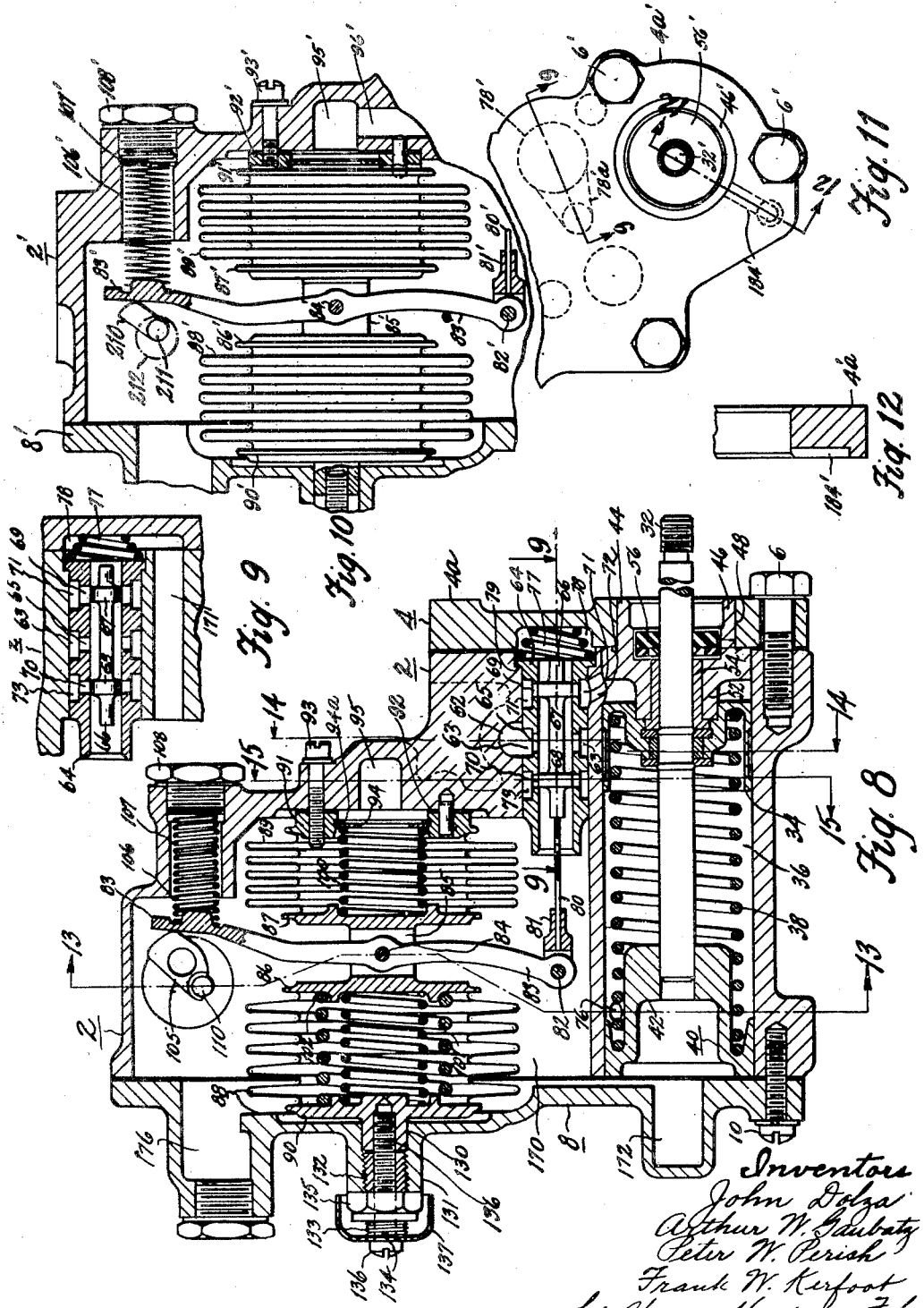

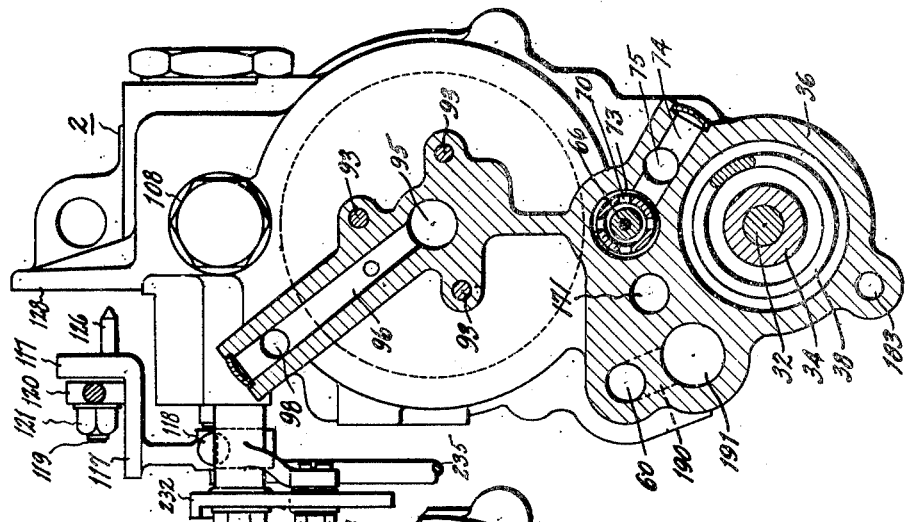

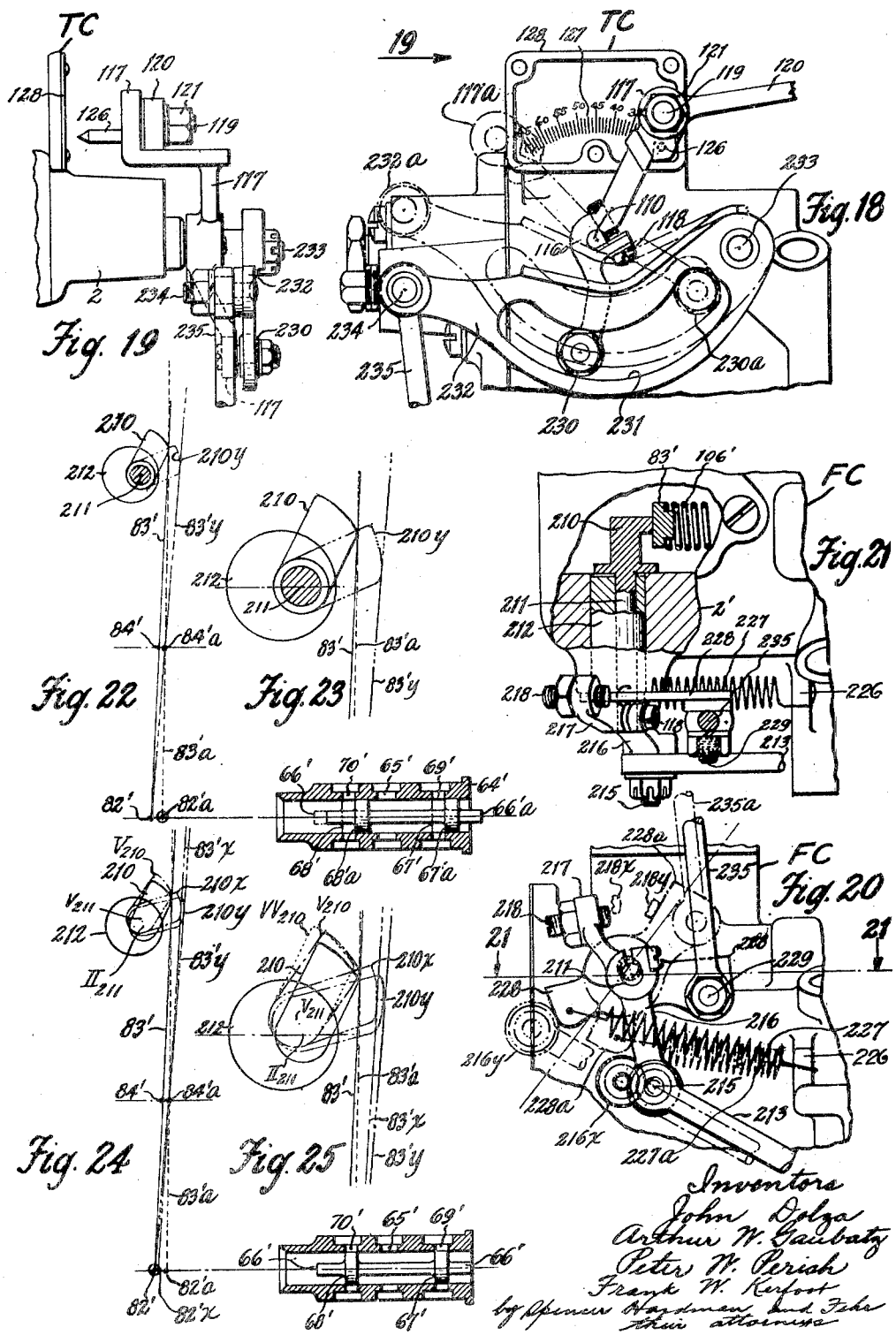

Dec. 20, 1949    J. DOLZA ET AL    2,491,482
ENGINE CONTROLLER
Filed Feb. 3, 1944    12 Sheets-Sheet 9

Inventors
John Dolza
Arthur W. Gaubatz
Peter W. Perish
Frank W. Kerfoot
by Spencer Hardman & Fehr
their ATTORNEYs

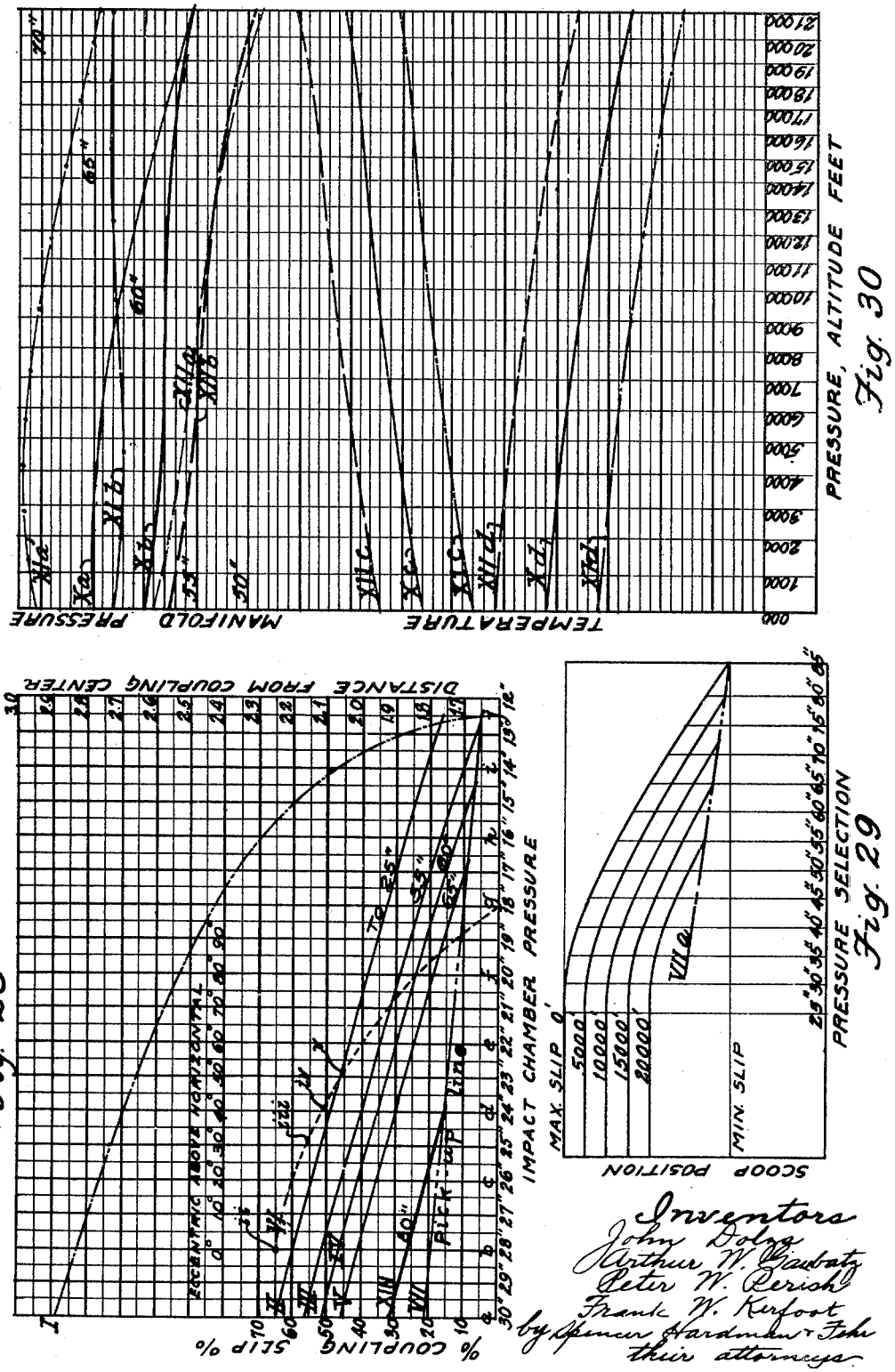

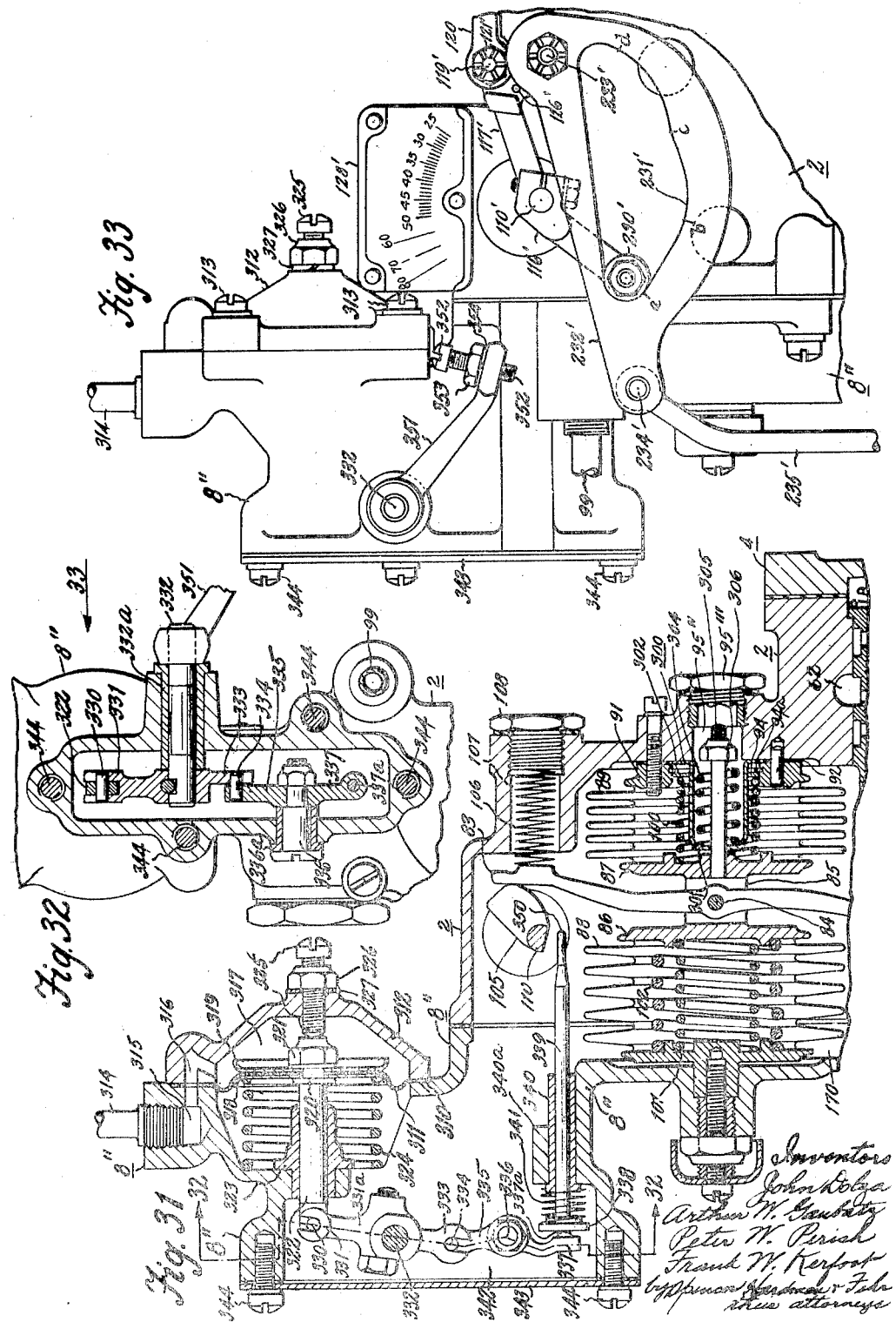

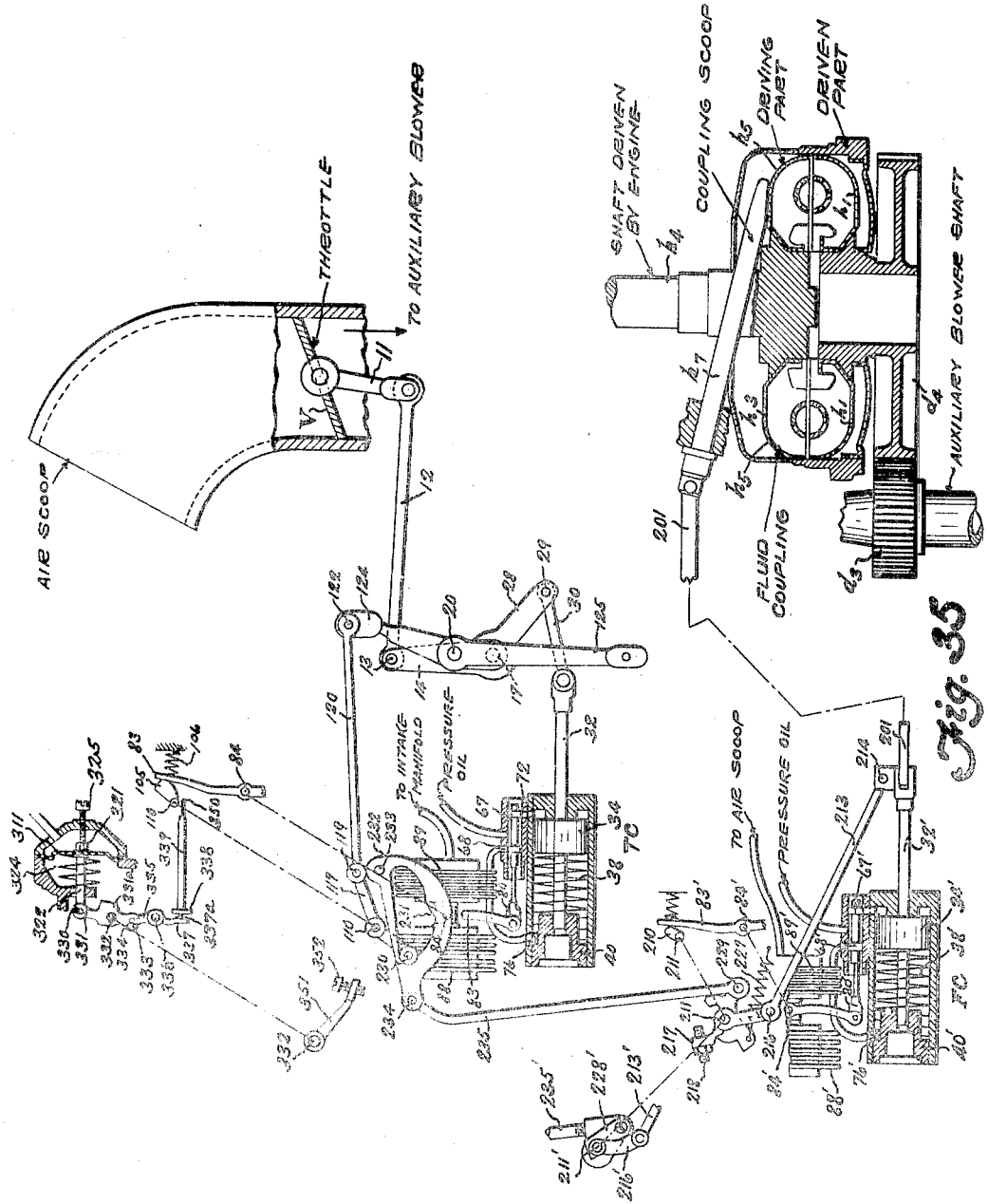

Patented Dec. 20, 1949

2,491,482

UNITED STATES PATENT OFFICE 2,491,482

ENGINE CONTROLLER

John Dolza, Arthur W. Gaubatz, Peter W. Perish, and Frank W. Kerfoot, Indianapolis, Ind., assignors to General Motors Corporation, Detroit, Mich., a corporation of Delaware Application February 3, 1944, Serial No. 520,878

39 Claims. (Cl. 123—103)

This invention relates to the control of the fuel intake pressure of an airplane internal combustion engine which is supercharged by a main supercharger driven by the engine at a fixed speed ratio and by an auxiliary supercharger driven by the engine through a variable speed drive.

It is the object of the present invention to control the variable speed drive connecting the engine with the auxiliary supercharger so as to obtain auxiliary supercharger speed as a function of selected manifold pressure and altitude air inlet scoop pressure or carburetor impact pressure and, at the same time, stay below borderline detonation of the engine for whatever type of fuel or fuels be used. In the disclosed embodiment of the invention, this object is accomplished by providing an infinitely variable fluid coupling between the engine and auxiliary supercharger the action of which coupling is controlled by varying the quantity of hydraulic fluid therein and this is accomplished by shifting a coupling scoop or tube which determines the rotating level of fluid in the coupling. The nearer the coupling scoop is to the axis of rotation of the coupling, the less will be the coupling slip and the greater the coupling drive ratio. The coupling scoop is shifted automatically by a controller which is responsive to variation in impact pressure and to variation in pressure selection. Impact pressure is a pressure function of static (altitude) atmospheric pressure plus dynamic impact pressure caused by the air speed of the airplane minus the restrictions encountered by the air flowing within scoop to the engine. Impact pressure varies with altitude and airplane speed. The control of the operation of the fluid-coupling controller in response to variation in pressure selection is obtained by coordinating the fluid-coupling controller with a boost controller or throttle valve regulator by which the throttle valve is automatically moved so as to maintain a certain fuel intake pressure which is selected by manual operation. The coordination between the regulator and coupling controller is such that, in response to increase in pressure selection, the ground level starting position of the coupling scoop moves near to the coupling axis, so that the ground level starting ratio of the drive between the engine and auxiliary supercharger increases as pressure selection increases beyond a certain low value. From that ground level starting position of the coupling scoop which has been determined by the pressure selection or datum adjustment of the throttle regulator, the coupling scoop moves toward the coupling axis as altitude increases. These devices provide that whatever pressure is selected will be maintained by the combined operation of the main and auxiliary superchargers as altitude increases. In order that a selected pressure suitable for normal military power can be maintained up to a certain high altitude, the fluid coupling ratio should increase with altitude up to its maximum (for example 95%) but at no time should it increase enough to cause manifold pressure in excess of borderline detonation. Emergency power and its corresponding manifold pressure represents power in excess of the military power. For this operating condition the drive ratio of coupling is usually greater for military power but does not exceed borderline detonation when borderline detonation altitude is reached. After the last mentioned altitude is reached (which is less than the altitude attained without detonation when a normal military pressure is selected) the coupling ratio must increase at a lesser rate at altitude continues to increase so that the pressure actually obtained will not cause detonation. The present invention provides means for reducing the rate of increase of fluid-coupling ratio for further increase of altitude after an altitude is reached at which the selected pressure is almost at the detonation point. The result is that the pressure actually obtained with wide open throttle begins, above that altitude at which the selected pressure is close to the detonation point, to fall off as altitude further increases so that the altitude which is critical for the normal military pressure selection can be attained without detonation and without substantial reduction in engine power output. In other words, in an emergency, the engine is caused to operate with maximum emergency power up to an altitude such that detonation would occur; and, thereafter, the power is reduced only enough to avoid detonation.

A further feature of the invention resides in the provision of means for automatically increasing the intake pressure obtainable when an anti-detonant is being supplied to the engine and means controlled by fluid under pressure for preventing such increase in pressure when the supply of anti-detonant is exausted.

Further objects and advantages of the present invention will be apparent from the following description, reference being had to the accompanying drawings wherein a preferred embodiment of the present invention is clearly shown.

In the drawings:

Fig. 4 is a fragmentary side view of the auxiliary supercharger unit, this view being taken in the direction of arrow 4 of Fig. 3.

Fig. 5 is a fragmentary sectional view on line 5—5 of Fig. 4.

Fig. 6 is a fragmentary view of the auxiliary supercharger unit looking in the direction of arrow 6 of Fig. 4.

Figs. 7a and 7b taken together constitute a fragmentary view looking in the direction of arrow 7 of Fig. 6, that part which is shown in section being a sectional view on line 7—7 of Fig. 5.

Fig. 8 is a sectional view of the throttle valve regulator shown in Fig. 4 and is taken on section line 8—8 of Fig. 4.

Fig. 9 is a fragmentary sectional view on line 9—9 of Figs. 8 and 11.

Fig. 10 is a view similar to Fig. 8 and is a fragmentary sectional view of the fluid coupling controller and is taken on the line 10—10 of Fig. 6.

Fig. 11 is a fragmentary front view of the right end cover plate of the fluid coupling control and is taken in the direction of arrow 11 of Fig. 7a.

Fig. 12 is a sectional view on the line 12—12 of Fig. 11.

Fig. 13, Fig. 14, Fig. 15 are, respectively, sectional views taken on line 13—13, 14—14, and 15—15 of Fig. 8.

Figs. 16 and 17 are fragmentary sectional views taken, respectively, on the lines 16—16 and 17—17 of Fig. 13.

Fig. 18 is a fragmentary side view of the throttle controller TC of Fig. 6 and is drawn to a larger scale than Fig. 6.

Fig. 19 is a view looking in the direction of the arrow 19 of Fig. 18.

Fig. 20 is a fragmentary side view of the fluid coupling controller FC of Fig. 7a, and is drawn to a larger scale than Fig. 7a.

Fig. 21 is in part a plan view of the mechanism shown in Fig. 20 and is in part a sectional view, the section being taken on the line 21—21 of Fig. 20.

Fig. 22 is a mechanical diagram to show the operation of the fluid coupling controller without modification by the throttle regulator.

Fig. 23 is a fragment of the diagram of Fig. 22 drawn to a larger scale.

Fig. 24 is a diagram similar to Fig. 22 to show the operation of the fluid coupling controller when modified by the throttle regulator.

Fig. 25 is a fragment of the diagram shown in Fig. 24 and is drawn to a larger scale.

Figure 26:
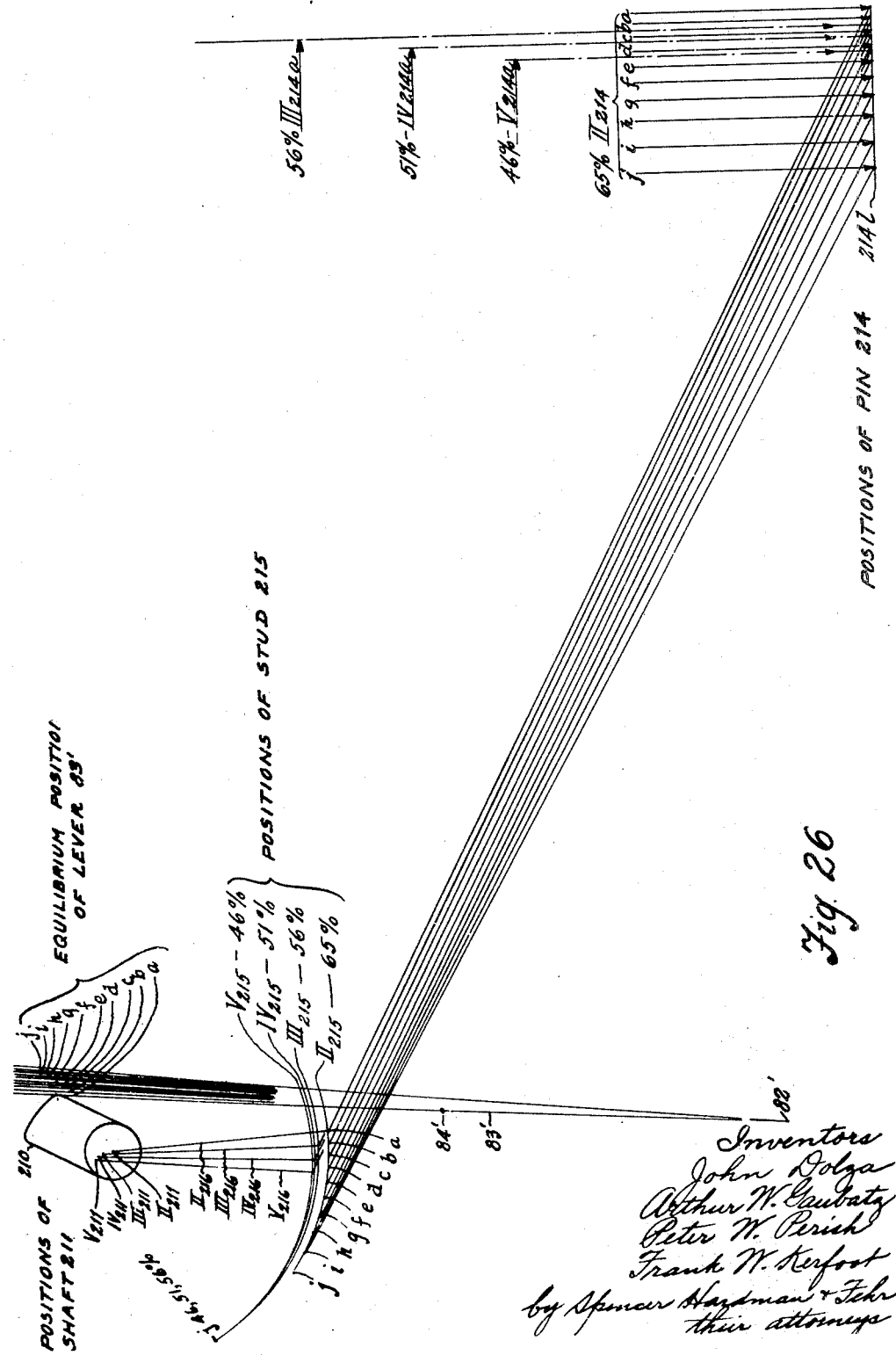

Fig. 26 is another diagram showing the operation of the fluid coupling controller particularly with respect to the derivation of the shape of the control cam of the controller.

Figures 27, 34:
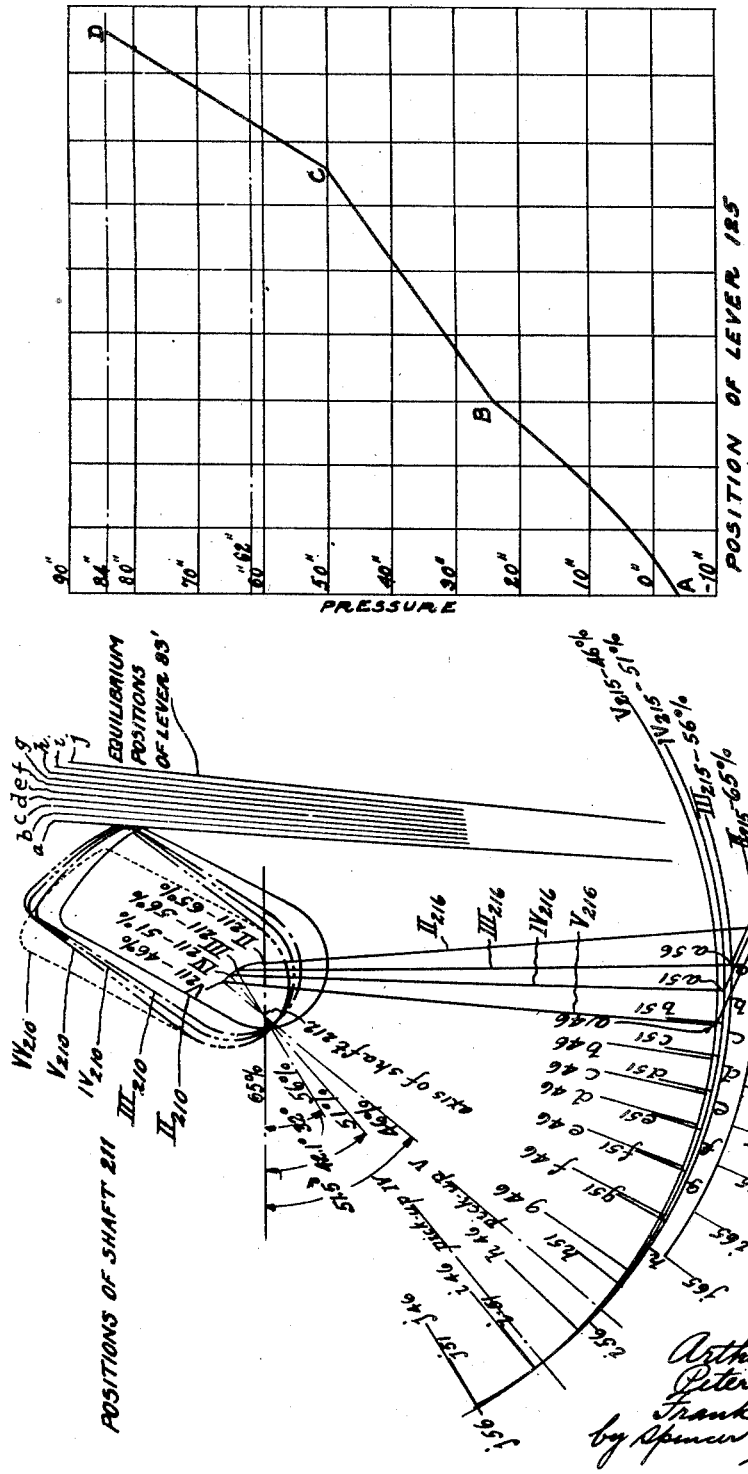

Fig. 27 is a fragment of the diagram shown in Fig. 26 drawn to a larger scale.

Figs. 28, 29 and 30 are charts indicating the operation of the fluid coupling controller.

Fig. 31 is a fragmentary longitudinal sectional view of a modification of the regulator shown in Fig. 8.

Fig. 32 is a sectional view on line 32—32 of Fig. 31.

Fig. 33 is a fragmentary side view looking in the direction of arrow 33 of Fig. 32.

Fig. 34, which is on the same sheet with Fig. 27, is a diagram showing the operation of the modified regulator.

Fig. 35 is a diagrammatic view of an apparatus embodying applicants' invention.

Figure 1:
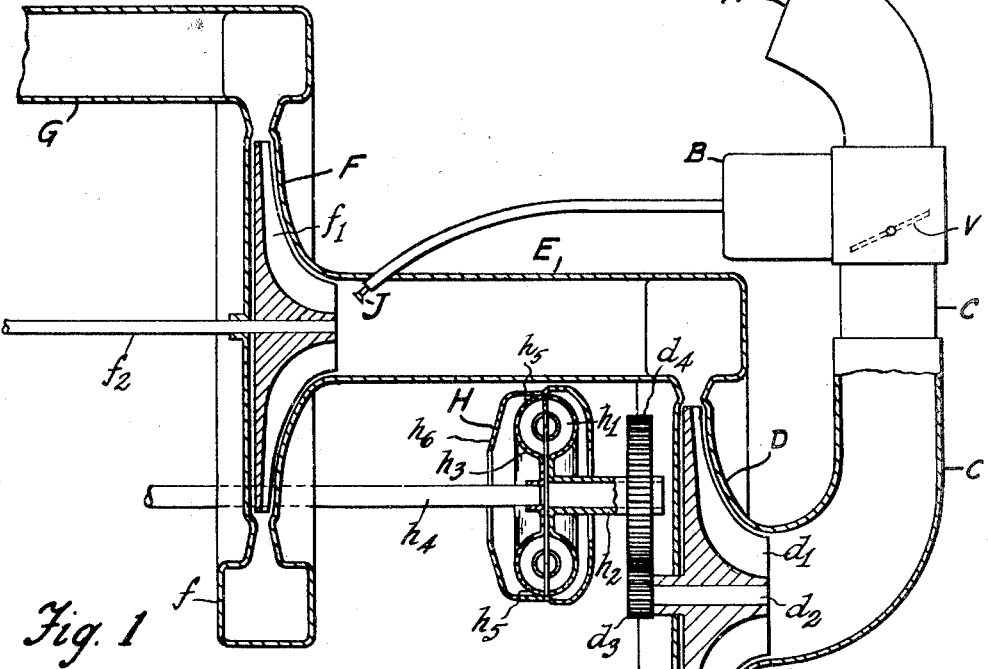
Fig. 1 is a diagram of the fuel induction system with which this invention can be associated. The type of fuel system can be varied.

The fuel induction system with which this invention can be associated is shown diagrammatically in Fig. 1. The air enters the air scoop A and flows thru a carburetor B having a valve V for controlling the quantity of air which is later to be mixed with liquid fuel regulated by the carburetor. Carburetor B is connected by passage C with the inlet of auxiliary supercharger D having an impeller $d_1$ mounted on a shaft $d_2$ driven by a gear $d_3$ meshing with a gear $d_4$. The outlet casing $d$ of supercharger D is connected by passage E with the inlet of the engine stage supercharger F, or main supercharger, having an impeller $f_1$ driven directly by the engine driven shaft $f_2$. The outlet casing $f$ of supercharger F is connected with engine intake manifold G. Liquid fuel is directed by nozzle J to the air flowing through passage E.

The auxiliary supercharger impeller $d_1$ is driven by the engine thru an infinitely variable fluid coupling H having a driven vane member $h_1$ attached to a hollow shaft $h_2$ connected with the gear $d_4$. The driving vane member $h_3$ of the coupling H is attached to an engine driven shaft $h_4$. To the driving vane member $h_3$ there is attached an annular hood $h_6$ which surrounds both vane members of the coupling. The motion transmitting fluid for the coupling passes thru the hollow shaft $h_2$ and then radially between the coupling members. From member $h_3$ oil passes out through a number of holes $h_5$ into the hood $h_6$ so that the rotary level of oil in the hood is substantially the same as in the coupling.

Figure 2:
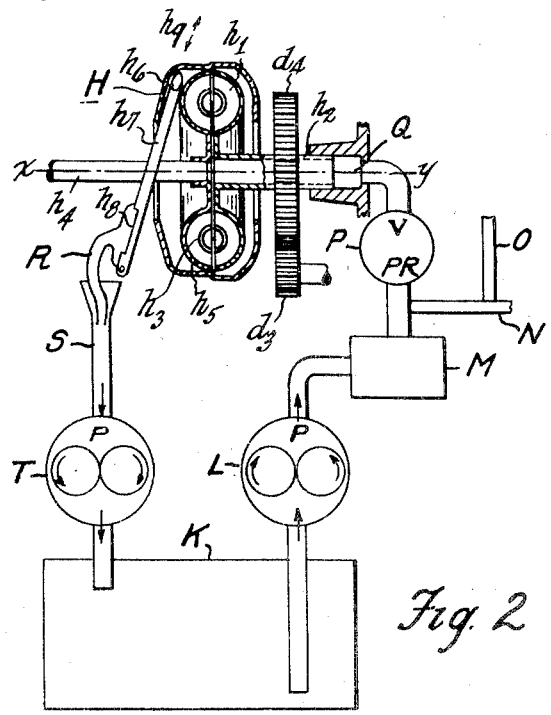
Fig 2 is a diagram of a circulatory system.
Figure 3:
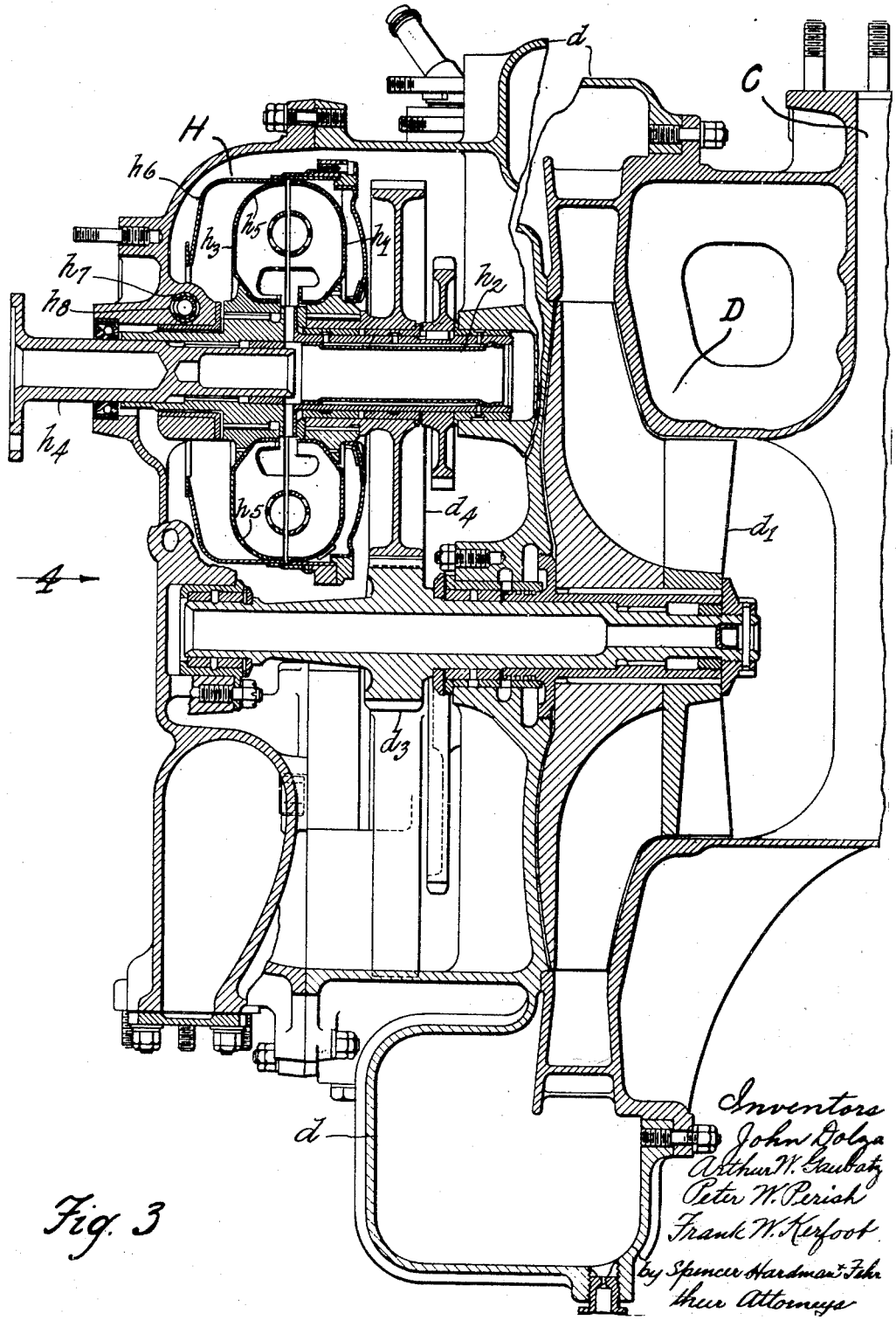
Fig. 3 is a fragmentary longitudinal sectional view of the auxiliary supercharger unit with hydraulic coupling shown diagrammatically in Fig. 2, the sectional view of the hydraulic coupling shown in Fig. 3 being on the line 3—3 of Fig. 4.

In order to vary the slip percentage or coupling ratio the rotary oil level is varied by changing the position of a coupling scoop $h_7$ shown in Fig. 2. The further the coupling scoop is from the axis $x$—$y$ of the coupling, the lower will be the rotary oil level and the greater the slippage and the lesser the coupling ratio. As the coupling scoop $h_7$ is moved downwardly in Fig. 2, so as to bring its scooping end nearer to the axis $x$—$y$, the rotary oil level will be raised and likewise the coupling ratio. The oil which flows out the coupling scoop $h_7$ is received by a vessel R having an outlet leading into a pipe S which leads to the inlet of a scavenger pump T which pumps both liquid and air and delivers the same to an oil cooler and/or tank K. An oil supply pump L withdraws oil from tank K and forces it thru a cleaner M, and thence to a pipe N which leads to the shaft bearings of the supercharger unit and to a pipe O which conducts oil to the respective servo-motors of the valve regulator TC and the coupling control FC to be described. The oil in excess of bearing requirement is released by a relief valve P and flows into a recess Q provided by a bearing for the right end of shaft $h_2$. This oil flows into the fluid coupling and is returned to the oil tank K by the scavenger pump T according to the position which the coupling scoop $h_7$ occupies with respect to axis of the coupling.

The coupling scoop $h_7$ shown in section Figs. 7a and 7b is adjusted automatically by the fluid coupling controller designated in its entirety by FC. The controller FC is responsive to changes in altitude and is also under the control of the throttle valve regulator TC shown in Figs. 4 and 6 above the fluid coupling controller FC.

The instruments FC and TC are somewhat similar in construction. The throttle valve regulator controller TC will first be described with particular reference to Figs. 8 and 13 to 17.

The framework of the controller TC comprises a housing 2 and a bracket 4 secured by a bolt 6, and screws 6a. The housing 2 is provided with mounting feet 7 (Fig. 6) adapted to be secured to the auxiliary supercharger frame ASF. The pressure operated mechanism for controlling the position of the throttle valve V (Figs. 1 and 6) is located within the housing 2. As shown in Figs. 4 and 6 screws 10 secure to the housing 2 end plate or head 8 in which certain fluid passages are formed, for a purpose later set forth.

Referring to Fig. 6, the carburetor throttle valve V is rotated by an arm 11 connected by a link 12 with the stud 13 of a differential bell crank lever 14. The lever 14 is enlarged to form a hub which receives the outer race of a ball bearing 15, the inner race of which is supported by a stud 17 carried by an arm 18 which is secured to a shaft 20 rotatably supported by the bracket 4. The lower end 28 of the lever 14 (Fig. 6) is pivotally connected at 29 with a link 30 pivotally connected at 31 with a piston rod 32 attached in any suitable maner to a piston 34 (Fig. 8) slidable in a cylinder 36 formed in the housing 2. The piston 34 is normally held in the position shown in Fig. 8 by a spring 38 located between the piston 34 and a cylinder head 40 which is fixed in one end of the cylinder 36 and which has a sleeve 42 formed at the center thereof to provide a bearing in which one end of the piston rod 32 slides. Another cylinder head 44 is located in the opposite end of cylinder 36 and provides an annular extension 46 received in a hole 48 in bracket 4. The cylinder head 44 has a centrally disposed annual extension 52 in which is received a bushing 54 which provides a second bearing for the piston rod 32. A suitable seal 56 is supported within the extension of head 44 to prevent any leakage of fluid around the piston rod.

The piston 34 and cylinder 36 constitute a servo-motor for automatically operating the differential lever 14 to move the throttle valve V of the carburetor. Oil pressure, as controlled by an automatic valve, provides the motive power for moving the piston. To effect movement of the piston 34, oil under pressure is supplied by pipe O, T-coupling O1 and pipe O2 to a passage 60 (Figs. 4, 6, 13, 14 and 15) provided by housing 2 from an oil pressure source represented in Fig. 2 as pump L. Passage 60 leads to passage 62 (Fig. 14) connected with an annular groove 63 (Fig. 8) in a tubular valve guide 64 connected with the interior thereof by a plurality of ports 65 located in an annular row. Guide 64 supports a valve 66 having lands 67 and 68 which control communication between ports 65 and either of the groups of valve guide ports 69 and 70, each group being a plurality of ports as shown in Fig. 14. One of the ports 69 is wider than land 67 as shown in Fig. 9 to provide for restricted circulation of oil through the controller even when land 67 is located as shown in Fig. 8. Ports 69 lead to valve guide groove 71 leading through passage 72 to the right side of piston 34. Ports 70 lead to valve guide groove 73 leading through passages 74, 75 and 76 (Fig. 16) to the left side (Fig. 8) of piston 34. A spring 77 located in a pocket 78 between housing 2 and bracket 4 urges the guide 64 against a shoulder 79 provided by housing 2.

Valve 66 is connected by rod 80, clevis 81 and pin 82 with a lever 83 pivoted on a pin 84 carried by a bridge 85 connecting movable end plates 86 and 87 of metal bellows 88 and 89, respectively, having relatively fixed end plates 90 and 91, respectively. Screws 93 secure the plate 91 to housing 2 with a sealing gasket 92 between them.

The interior of bellows 89 is connected either with the supercharger casing f or with the engine intake manifold G through apertured disc 94 (carried by plate 91), pocket 95, cross passage 96, horizontal passage 98 (Fig. 15) and pipe 99 (Fig. 6). Bellows 88 is evacuated so that the bellows system is compensated for changes in atmospheric pressure and is responsive only to changes in engine intake pressure. Spring 100 in bellows 89 and springs 101 and 102 in bellows 88 are so constructed and calibrated that the relation of the movements of the pin 84 to changes in engine intake pressure is substantially a fixed linear relation.

The location of valve 66 is determined partly by the pressure within bellows 89 and partly by a pressure selecting cam 105 against which the upper end of lever 83 is urged by a spring 106 located in a recess 107 formed in housing 2 and closed at one end by a plug 108. Cam 105 is attached to a shaft 110 which is journalled in a bushing 111 secured to housing 2 (Fig. 13). Shaft 110 is gripped by the clamping hub 116 (Fig. 18) of a lever 117, the hub being tightened by a clamping screw 118. Stud 119 fixed to lever 117 provides a pivotal connection with a link 120 which is retained upon the stud 119 by a nut 121. Link 120 is connected to a stud 122 attached to lever arm 124 (Fig. 6) and is retained by a nut 123. Arm 124 is integral with arm 18 which through the shaft 20 is manually operated by a lever 125 known as the main control lever. The location of selector cam 105 by the main control lever 125 operating through the lever 117 selects working pressures from 25 to 65 inches of mercury, absolute, for example, which are indicated by a pointer 126 which moves past graduations 127 on a dial plate 128 carried by housing 2 (Fig. 18).

The device is calibrated for a certain specified pressure by holding lever 232 pivoted at 233 (Fig. 18) to a fixed height above pads 7 (Fig. 6), rotating lever 117 until roller 230 pivoted on lever 117 contacts cam 231 in lever 232, applying the specified pressure to bellows 89, bending pointer 126 to indicate the specified pressure on dial 127, and adjusting the location of pin 84. An adjustment of the pin 84 is made until the piston 34 is in a balanced condition, that is, floating and not touching either end of the cylinder. In order to adjust the location of pin 84 the bellows plate 90 has a stem 130 (Fig. 8) received by a tubular boss 131 on the plate 8 and in which is provided a tapped hole 132 for receiving an adjustable stop screw driver 133 having a screw blade slot 134 and locked by a nut 135. Screw 133 has a plain central bore receiving a screw 136 which retains a cover cup 137 and which threads into the stem 130 of plate 90 and which will draw the stem against the stop screw 133. To make the adjustment, remove the screw 136 and cover 137, loosen nut 135, apply oil pressure at passage 60. If piston 34 moves inwardly to left position in cylinder 36, turn screw 133 out until the piston 34 just begins to move right. This will indicate that the valve lands 67 and 68 have moved slightly to the left of the ports 69 and 70. Turn screw 133 slightly in the opposite direction until movement of piston ceases. This calibration should take place while the controller TC is being vibrated in order to cancel out frictional hysteresis. If, instead of moving inwardly when the oil pressure is applied in passage 60, the piston 34 stays in the outward position shown in Fig. 8, the screw 133 is turned inwardly until the piston starts moving to the left. Then the screw is turned slightly outwardly until movement of the piston ceases. After the adjustment is made, nut 135 is tightened and cover 137 and screw 136 are replaced and sealed.

During operation of the controller the bellows chamber 170 (Fig. 8) in housing 2 contains oil in order to dampen vibration of the bellows. Oil for this purpose is principally that which is discharged from the servo cylinder 36. When valve 66 is moved to the right from the position shown in Fig. 8 to connect ports 65 and 69 in order that the piston 34 will move left, the oil on the left side of the piston will be discharged through passages 76, 75, 74 (Fig. 16) groove 73 (Fig. 8) and through the guide 64 to the chamber 170. When valve 66 moves left from the position shown to connect ports 65 and 70, oil at the right of the piston 34 is discharged through a passage 72, groove 71, guide 64, pocket 78, a passage 171 (connected with pocket 78 as shown in Fig. 9) and into chamber 170. Chamber 170 drains into a pocket 172 in plate 8 connected by a flow restricting hole 173 with a drain 174 (Fig. 4) with which a pipe 175 may be connected. During operation of the controller, oil rises in the chamber 170 and overflows through passage 176 and passes down the drain 174 and pipe 175 into the housing 2' of fluid coupling controller FC.

Generally the leakage of oil past the land 67 and through the oversize port 69 (Fig. 9) when valve 66 is in the normal position shown, will provide for oil circulation at a rate sufficient to avoid congealing of the oil and allows oil, which would be otherwise trapped in the system, to circulate, to provide for immediate operation when the engine is cold. However, if the foregoing procedure should prove inadequate, a temperature controlled oil by-pass can be provided. As shown in Figs. 9, 13, 14, and 15, high pressure oil inlet passage 60 is connected with bellows chamber 170 through a by-pass including passages 190, 191, 192 and 171. As shown in Dolza Patent No. 2,451,204, this by-pass is controlled by a thermostat valve which maintains the by-pass open until the oil has become warm enough for proper operation of the throttle controller. If the thermostat valve is not required, this by-pass is permanently closed by a plug 195.

Valve V is opened manually by counterclockwise movement of lever 125 which is connected with the pilot's throttle lever in any suitable manner not shown. When lever 125 is so moved, servo piston rod 32 remaining fixed, the differential lever 14, 28 moves to the right and rotates clockwise to cause valve V to rotate counterclockwise from the idle position shown in Fig. 6. The manual control of valve V is sufficient for take-off from ground level or to make a safe landing in case of failure of oil-pressure in servo-cylinder 36 (Fig. 8), in which event spring 38 will return the piston 34 and rod 32 to normal position.

Lever 125 is positioned by the pilot for the purpose of selecting a pressure to be maintained by the automatic throttle controller TC. If, for example, the required pressure is 60" Hg, the pilot moves the throttle lever to such position on a quadrant that the movement which is imparted to lever 125 is sufficient to cause lever 117 to be moved counterclockwise to a position such that pointer 126 is opposite the 60" mark on the dial 128. Cam 105 (Fig. 8) moves counterclockwise to permit spring 107 to move lever 83 counterclockwise and valve 66 to right to connect ports 65 and 69. Pressure fluid then flows into the right end of cylinder 36 and rod 32 moves left and valve V opens further than it was opened by manual operation of lever 125. The intake pressure increases and bellows 89 expands to cause pin 84 to move left and valve 66 to move toward the position of equilibrium or balance in which ports 69 and 70 are covered. When the valve V has been opened sufficiently to cause the intake pressure to equal the selected pressure, valve 66 will be in position of equilibrium. As altitude increases the piston rod 32 moves left to increase the opening of valve V in order to maintain the selected pressure; and, as altitude decreases, the piston rod moves right to decrease the opening of valve V in order that the selected pressure will not be exceeded. The extent to which the valve V is opened by the combined effect of manual operation by the pilot's throttle lever and of automatical operation by the throttle controller TC varies somewhat according to the pressure selected. Over a substantial range of high pressure selections, the valve V can be brought to such wide-open position that it offers no appreciable restriction to air flow.

The pressure in manifold G (Fig. 1) is dependent on the position of throttle valve V and the speed of the superchargers. The speed of main supercharger F is solely dependent on engine speed. The speed of auxiliary supercharger D is dependent on engine speed and the coupling ratio of fluid coupling H which is controlled in response to altitude and pressure selection by the fluid coupling controller FC which will now be described.

The fluid coupling controller FC is similar in construction to the throttle controller TC. The parts of controller FC shown in Fig. 10 which are similar to parts of the throttle controller TC shown in Fig. 8 are given the same reference numerals with a prime (') appended. Like controller TC, controller FC has a housing 2' closed at the left by a plate 8' and at the right by a plate 4a' which is similar to the vertical plate 4a of bracket 4 of controller TC. Like controller TC, controller FC has a servo-motor including a piston rod 32'. Rod 32' is connected by a pin 200, link 201, and pin 202 with coupling scoop $h_7$ (Fig. 7a). The admission of pressure fluid to the cylinder 36' of the servo-motor is controlled by a valve 66' (Fig. 22) slidable in a guide 64'. Valve 66' is moved by lever 83' which is under the control of impact pressure and a cam 210. Bellows 88' is evacuated and bellows 89' (Fig. 10) is connected either with the air scoop A (Fig. 1) or with the impact chamber (not shown) of carburetor B. These bellows enclose springs (not shown) similar in function to the springs 100, 101, 102 enclosed by the bellows 88 and 89 of controller TC; and the springs enclosed by bellows 88' and 89' are so constructed and calibrated that the pin 84' supporting lever 83' moves in a predetermined relation to changes in impact pressure.

Cam 210, against which lever 83' is urged by spring 107', is integral with shaft 211 eccentrically journalled in a shaft 212 journalled in housing 2' (Fig. 21). Shaft 211 is operated by the servo-piston-rod 32' through means including a link 213 (Fig. 7a) connected by pin 214 with the head of pin 200, and connected by pin 215 with a lever 216 attached to shaft 211 and having an arm 217 carrying an adjustable stop screw 218 locked in adjusted position by a nut 219. As the plane ascends impact pressure decreases and bellows 89' (Fig. 10) begins to collapse thus causing pin 84' to move toward 84'a in Fig. 22. Lever 83' moves toward 83'a. Valve 66' moves from normal or equilibrium position 66' (shown in broken lines) toward the position 66'a (shown in full lines). Pressure fluid is then admitted to the right end (Fig. 7a) of cylinder 36', and rod 32' and coupling scoop $h_7$ move left to decrease the slippage of fluid-coupling H and to increase the speed of the supercharger D. As rod 32' moves left, cam 210 turns clockwise toward 210y (Figs. 22, 23) to cause lever 83' to move away from 83'a toward 83'y so that the lever end moves away from 82'a toward 83' and valve 66' moves left from 66'a to 66' (Fig. 24) to close ports 69' and 70'. Then movement of rod 32' toward the left ceases. Cam 210 is so shaped that it places the valve 66' in the equilibrium position for closing ports 69' and 70' when a certain predetermined relation between impact pressure and position of coupling scoop $h_7$ has been satisfied. That relation will now be explained with reference to Fig. 28.

Curve I of Fig. 28 shows a typical example of the relation between coupling scoop position, ranging from 3.0" to 1.7" between center of coupling H to tip of coupling scoop $h_7$, and impact pressure, ranging from value $a$ or about 30" Hg absolute at ground level to value $j$ or about 12.5" Hg at an elevation of about 21,000 feet. Curve I shows what the coupling scoop position should be for impact pressure values $a$ to $j$ at the coupling speed corresponding to slip curve III in order that the supercharger D will run at speeds providing, for example, approximately 9600 pounds per hour air flow. At ground level, represented by pressure $a$ (about 30" Hg), the coupling scoop tip is 2.9" from coupling axis with a coupling slip value of about 56% according to curve III. This means that the supercharger D operates normally at ground level at such speed that it will not cause any restriction to air flow at the rate of 9600 pounds per hour as effected by supercharger F, and may even aid normally in maintaining such rate of air flow.

Curve II, for Normal part throttle slip, shows the relation between impact pressure and coupling slip for normal or part throttle operation where the pressure selected to be maintained by the throttle controller TC is no greater than 25" Hg, such as required for cruising with minimum power. Fig. 26 (bottom) shows the various positions of pin 214 (connecting the piston rod 32' with link 213, see Fig. 7a) which will effect the coupling slips called for by curve II. Positions II, 214a ... 214j on line 214l are the positions of pin 214 which have been found to give the coupling slip called for by curve II when the impact pressures are from $a$ to $j$. At the upper left of Fig. 26 are shown various equilibrium positions of lever 83' marked $a$ to $j$. These equilibrium positions are those which cause the valve which controls the fluid coupling control servo to be in the position 66' (broken lines, Fig. 22) closing ports 69' and 70'; and these equilibrium positions are determined by the location of fulcrum point 84' and by the location of cam 210.

The various locations of fulcrum 84' are determined by pressures $a$ to $j$ in bellows 89'. The location of cam 210 is determined by various positions II, 214a to $j$ of pin 214 and by the corresponding positions of pin 215 (on end of lever 216) at II$_{215}$ $a$ to $j$ or arc II$_{215}$ whose radius is lever 216, starting at II$_{216}$, and whose center is the axis of shaft 211 at position II$_{211}$. Reference II in Fig. 26 identifies parts 214, 215, 216, 211 with line II in Fig. 28 which is the coupling slip curve for pressure selections up to 25" Hg. At ground level, the slippage is 65% indicated by the left end of line II. Point II$_{214a}$ is the starting point of pin 214a, point II$_{215a}$ is the starting point of pin 215, and II$_{216}$ is the starting location of lever 216 for ground level impact pressure $a$ or 30" Hg. As altitude increases, altitude or impact pressure decreases from $a$ to $j$, pin 214 moves from II$_{214a}$ to II$_{214j}$ on line 214l, and pin 215 moves on arc II$_{215}$ from $a$ to $j$ and cam 210 turns clockwise to cause lever 83' to move to equilibrium positions $a$ to $j$. Thus for all pressure selections up to and including 25" Hg, there is a definite schedule of relations between altitude pressure and coupling slip as represented by line II in Fig. 28. This schedule is suitable for part load operation of the engine to meet the requirements of minimum cruise.

Under curve II of Fig. 28, there are curves III, IV and V of substantially the same slope as curve II but having starting points which are lower in coupling slip value. Curve III, for Military at 55" Hg, which is the curve for a pressure selection of 55", has a ground-level starting point of 56% coupling slip. Curve IV, for Emergency at 60" Hg, which is the curve for pressure selection of 60", has a ground level starting point of 51% coupling slip. Curve V, for Emergency at 65" Hg, which is the curve for a pressure selection of 65", has a ground level starting point of 46% coupling slip. As the pressure selection increases above 25" Hg, the starting point of coupling slip decreases; and coupling slip decreases from starting point as altitude and impact pressures decrease. Thus far we have been concerned only with decrease of coupling slip as impact pressure decreases. We shall now describe how we obtain the lowering of the starting point of percentage of coupling slip as pressure selection increases.

Referring to Fig. 18, the lower end of lever 117 which operates pressure selecting cam 105 carries a roller 230 engaging a cam 231 provided by a slot in a lever 232 pivoted on a stud 233 attached to housing 2 of controller TC. Lever 232 is connected by stud 234 with a link 235 connected at its lower end by stud 229 with a lever 228 attached to the shaft 212 which eccentrically supports the shaft 211 of cam 210 (Fig. 20). A spring 227 attached to a lug 226 of housing 2' and to the lever 228, urges the lever counterclockwise, the link 235 upwardly and lever 232 upwardly, upward movement being limited by contact of the cam 231 with the roller 230. The cam 231 is so shaped as to permit no upward movement of lever 232 until pressures higher than 25" Hg are selected. Then the higher the pressure selection, the greater will be the upward movement of lever 230 and the counterclockwise movement of lever 228 under the action of spring 227.

Normally lever 228 is in the full line position shown in Fig. 20, which position it occupies when the pressure selected is from 0" to 25". When the selected pressure exceeds 25" the lever 230 begins to move up. If, for example, the selected pressure is 65", lever 117 is in position 117a (Fig.

18) and lever 230 moves to 230a and lever 228 (Fig. 20) moves to 228a. The axis of shaft 211 moves 51.5° counterclockwise from II211 marked 65% to V211 marked 46% (Fig. 27). This means that the ground level starting point of coupling slip has decreased from 65% to 46%. In other words, we have dropped from curve II (Fig. 28) to curve V which represents slip values for impact pressure values when the pressure selection is 65". The starting point of pin 214 has been shifted left from AII or to av (Fig. 27) or from II214a to V214a on line 214l (Fig. 26). This happens because cam 210 moves from V210 to VV210 (Figs. 25 and 27) immediately following change of pressure selection from a low value 25". Therefore there must be a left movement of the coupling scoop h7 before cam 210 is brought to position V210 (Fig. 25) when it locates lever 83' in the ground level equilibrium position 83'a. The first position of stud 215, when cam center is at V211 (Fig. 27), is point a46 on arc V215 marked 46%. The other positions corresponding to impact pressures b to j are marked b46 to j46 on arc V215.

If the selected pressure has been 55", curve III (Fig. 28) would represent the relation between coupling slip, and impact pressure. The starting point of pin 214 would be at III214a marked 56% (Fig. 26) or aIII (Fig. 27) to indicate a ground level coupling slip of 56%. The starting point of stud 215 is at a56 on arc III215 marked 56% and having its center at III211 which is 32° away from normal. Selection of 55" pressure had caused shaft 212 to move the axis of cam shaft 211 to position III211. The other positions of stud 215 for the 55" pressure selection are shown by points b to j on arc III215 and correspond to impact pressures b to j.

If the selected pressure had been 60", curve IV (Fig. 28) would represent the relation between coupling slip and impact pressure. The starting point of pin 214 would be at IV214a marked 51% (Fig. 26) or aIV (Fig. 27) to indicate a ground level coupling slip of 51%. The starting point of stud 215 is at a51 on arc IV215 marked 51% and having its center at IV211 which is 42.1° away from normal. Selection of 60" pressure had caused shaft 212 to move the axis of cam shaft to position IV211. The other positions of stud 215 for the 60" pressure selection are shown by points b to j on arc IV215 and correspond to impact pressures b to j.

If the selected pressure had been 65", curve V (Fig. 28) would represent the relation between coupling slip and impact pressure. The starting point of pin 214 would be at V214a marked 46% (Fig. 26) or av (Fig. 27) to indicate a ground level coupling slip of 46%. The starting point of stud 215 is at a46 on arc V215 marked 46% and having its center at V211 which is 51.5° away from normal. Selection of 65" pressure had caused shaft 212 to move the axis of cam shaft to position V211. The other positions of stud 215 for the 65" pressure selection are shown by points b to j on arc V215 and correspond to impact pressures b to j.

From Fig. 27 it will be noted that the "a" position of stud 215 for each of the cam shaft axis locations II211, III211, IV211, V211 causes the cam 210 to be in positions II210, III210, IV210 and V210 respectively, and that cam positions II210, III210, IV210, V210 all cause the lever 83' to be in ground level equilibrium position a. It is true that, for all locations of axis of cam shaft 211, when the stud 215 is in any of its b positions (either on arc II215 or III215 or IV215 or V215) cam 210 will locate lever 83' at its b equilibrium position corresponding to impact pressure b. The foregoing is true for the other positions c to j of stud 215.

Curve VI of Fig. 28 chart shows the relation between movement of eccentric shaft 212 and starting point of coupling slip. Point ii on curve VI is vertically below 0° on the eccentric scale and horizontally opposite 65% slip on curve II. Point iii on curve VI is vertically below 32° on the eccentric scale and horizontally opposite 56% on curve III. Point iv on curve VI is vertically below 41.5° on the eccentric scale and horizontally opposite 51% on curve IV. Point v on curve VI is vertically below 51.5° on the eccentric scale and horizontally opposite 46% on curve V. These values correspond with the slip percentages and eccentric angles found in Fig. 27.

Curve Xd of Fig. 30 shows that outside temperature decreases as altitude increases; and curve Xc shows that supercharger air temperature increases with altitude increase. Detonation point depends on fuel temperature and pressure. As temperature increases, the pressure must be lowered to avoid detonation. Curve III (Fig. 28) represents a coupling slip decrease which is correct for pressure selection of 55" Hg when impact chamber pressure increases from value a (about 30" Hg) to j (about 12.5" Hg) which corresponds to altitude increase to about 21,000'. By correct is meant that coupling slip can decrease at the rate indicated by curve III without causing detonation. For higher pressure selections like 60" and 65" this rate cannot be maintained throughout the same altitude range without causing detonation. We therefore allow approximately the rate indicated by curve III to be maintained up to certain altitude, and then cause a reduction in the rate of coupling slip decrease, so that detonation will be avoided. In Fig. 28 chart, line VII represents the pick-up line. It intersects curve V at about the 16.7" impact pressure point and curve IV at about the 14.5" impact pressure point. This means that, when 65" pressure is selected, coupling slip follows curve V from 30" to 16.7" impact pressure and then follows the pick-up line VII to pressure j or 12.5"; and that, when 60" pressure is selected, coupling slip follows curve IV from 30" to 14.5" impact pressure and then follows the pick-up line VII to pressure j. The pick-up point on curve V (Fig. 28) is marked "pick-up V" on arc V215 (Fig. 27); and the pick-up point on curve IV is marked "pick-up IV" on arc IV215.

Pick-up is the term applied to the operation of lever 216 (Fig. 20) in imparting a clockwise movement to lever 228 in subtracting some of the arcuate movement of cam shaft 211 which is obtained by virtue of a high pressure selection. For example, if the selected pressure was 65", the arcuate movement of the axis of cam shaft 211 was 51.5° to V211 in Fig. 27. By the time the j position of stud 215 is reached, the axis of the cam shaft 211 should be at III211. To effect this return movement while stud 215 carried by lever 216 is moving from "a" to "pick-up V" on arc V215, the screw 218 on lever 217 moves from 218x (Fig. 20) to 218y where it contacts lever 228. As lever 216 is moved by stud 215 from the "pick-up V" position to the "j" position, lever 228 is moved by screw 218 through an angle such that the axis 211 of the lever 216 and the cam 210 moves back to III211. This has the effect of a reduction in pressure selection between altitudes corresponding to impact pressure 16.7" and 12.5". Similarly, when the selected pressure was 60" requiring, initially, cam shaft position IV211, "pick-up IV"

on arc IV₂₁₅ indicates where the screw 218 of lever 216 picks up the lever 228 and causes cam shaft axis to shift from IV₂₁₁ to III₂₁₁ as the impact pressure changes from about 14.5″ to 12.5″ or $j$ value.

Figs. 24 and 25 show the various positions of cam 210 where pressure selection effects the initial shift of cam position and operation of the scoop servo causes the final shift of cam position. The cam stands normally at 210 and the valve control lever at 83′. Pressure of 65″ is selected and the cam moves orbitally around axis 212 to VV₂₁₀ (as in Fig. 27). The scoop moves toward coupling center to increase the slip starting point from 65% to 46% and cam moves to V₂₁₀ (as in Fig. 27) to bring lever 83′ back to the ground level equilibrium position $a$. As altitude increases and impact pressure decreases, bellows 89′ contracts and pin 84′ moves toward 84′$a$ (Fig. 24), and lever 83 moves toward 83′$a$ to move valve 66′ toward right from equilibrium position to cause the scoop servo to move further toward the coupling axis to decrease slip. At the pick-up point (pick-up V″ on arc V₂₁₅, Fig. 27), cam 210 is located at 210$x$ and lever 83′ is located at 83′$x$, while the valve 66′ is still to the right of its equilibrium position. During the "pick-up," cam 210 moves orbitally around the axis of shaft 212 in a clockwise direction while rotating about its own axis and comes to position 210$y$ causing lever 83′ to be located in equilibrium position 83′$y$ which corresponds to the $j$ position of lever 83′ shown in Figs. 26 and 27.

The Fig. 29 chart shows the relation of coupling slip to obtainable pressure at various altitudes from sea level to 21,000′ corresponding to impact pressure from $a$ to $j$. The pick-up line VII$a$ of this chart shows for example that, during ascent from 15,000′ to 21,000′ with a 65″ pressure selection, the controller operates in effect to reduce the selected slip to that required for 55″ pressure selection in order to avoid detonation.

With reference to Fig. 30, we will show how the foregoing principles are applied to certain engines. Curve X$d$ represents standard atmospheric temperature for altitudes ranging from 0 to 21 000 feet; curve XI$d$ represents standard atmospheric temperature minus 50° F. or winter condition; and curve XII$d$ represents standard atmospheric temperature plus 50° F. or summer condition. Curve X$c$ represents the air or mixture temperature after being compressed by the superchargers (manifold mixture) corresponding to standard intake air X$d$; similarly XI$c$ and XII$c$ represent the after-supercharger mixture or air temperature corresponding to intake air XI$d$ and XII$d$ respectively. Engine detonation occurs at lower manifold pressure as the temperature of the mixture fed to engine increases. Lines X$a$, XI$a$, XII$a$, represent the maximum pressure beyond which detonation develops when manifold mixture temperatures are X$c$, XI$c$, VII$c$ respectively, or temperatures of intake air to engine are X$d$, XI$d$, XII$d$. Lines X$a$, XI$a$, XII$a$, are sometimes called "border-line detonation manifold pressure curves" and represent the maximum manifold pressure at which a given engine and fuel can operate without detonation for given outside air temperatures and altitude. Lines X$a$, XI$a$, XII$a$ show also that in order to obtain the maximum power from the engine, if there are no other mechanical limitations to its strength, maximum manifold pressure can be increased, for a given altitude, as outside air temperature is decreased. In other instances the above practice can be followed only up to a maximum pressure, sometimes below curve XI$a$, at which excessive overload may occur in the engine.

In the present description it has been assumed that the engine be capable of handling up to 60″ Hg manifold pressure. While summer conditions require keeping the manifold pressure below line XII$a$ as air temperature decreases, the pressure should be allowed to approach the 60″ Hg without exceeding the detonation limit.

The results indicated in Fig. 30 have been approached by utilizing the fact that controller TC gives approximately a fixed schedule of blower speed versus impact (altitude) pressure independently of air temperature. If the engine throttle is wide open, the resulting manifold pressure boost (supercharger outlet pressure boost) is given by the following approximate equation:

$\Delta p$=pressure boost from supercharger
$\Delta p = K\delta\omega^2$
$K$=supercharger coefficient
$\omega$=supercharger angular speed
$\delta$=air density at a given temperature T abs., which is given by the equation $$\delta = \frac{\delta_0 T_0}{T}$$

$\delta_0$ being air density at $T_0$ or zero degrees absolute temperature. From the above it can be seen that a control capable of furnishing a fixed schedule of blower (or blowers) speed vs. altitude will supply higher pressures with cooler air and lower pressures with hotter air.

Curves X$b$, XI$b$, XII$b$, represent blower(s) outlet pressures available for the corresponding air temperature X$d$, XI$d$, XII$d$ and mixture temperature X$c$, XI$c$, XII$c$. Since X$b$, XI$b$, XII$b$ do not exceed appreciably or are less than the corresponding borderline detonations X$a$, XI$a$, XII$a$ then they can be used as means of controlling detonation. The excess of manifold pressure above a constant pressure at 49″ Hg, for example, (line XII$a$ at 21,000 ft.) and line XI$a$ represent the gain or advantage of this type of control over a fixed pressure control set for safe operation against detonation with year around setting. To obtain above gain, if engine has adequate mechanical strength, manifold pressure selection by controller TC should be in excess of XI$a$. If mechanical limitation of the engine requires limiting the maximum pressure to 60″ Hg, for example, then in winter controller TC will limit the maximum pressure to 60″ Hg by throttling, while in summer controller FC will keep the maximum pressure below 60″ so as not to exceed the values represented by XII$b$.

When the pressure selection is in the range between 25″ and 55″ Hg, the pressure obtained through the control of the auxiliary supercharger by the controller FC is at least equal to the manifold pressure selected by throttle controller TC, when operating in the summer (standard temperature plus 50° F.). In winter (standard temperature minus 50° F.), the controller FC of the auxiliary supercharger selects a higher pressure than that called for by the throttle controller TC; therefore, constant pressure is maintained by throttling by means of controller TC. Maintenance of constant pressure is necessary to coordinate pressure selection with propeller R. P. M. selection as effected by control of the propeller pitch governor (not shown).

When the pressure selection is 60" Hg, which is the maximum allowable selection for a particular engine, the throttle controller TC causes the fluid coupling controller FC to give manifold pressures according to Xb for standard temperature conditions and according to XIIb for summer conditions (standard plus 50° F.). Xb is below Xa (borderline detonation for standard temperature; and the major portion of XIIb is below XIIa (border line detonation for summer condition). That part of XIIb which is above XIIa is not above to such extent as to cause harmful detonation. Both Xb and XIIb are below the 60" Hg pressure selection. Therefore the throttle controller TC keeps the throttle valve wide open; while the coupling controller FC controls to give the pressure indicated by Xb or XIIb.

When 60" Hg pressure is selected during winter conditions, the controller FC so controls the auxiliary supercharger as to obtain manifold pressures according to XIb which are above 60" Hg. The throttle controller TC will partly close the throttle in order that the pressure will not exceed 60" although the controller FC is set to obtain pressure in excess of 60".

By such coordination of the controllers TC and FC, we are able to obtain the maximum selected pressure during winter operating conditions and avoid harmful detonations at higher temperatures.

With better fuel and higher engine mechanical strength it may be possible to operate without detonation up to 65" Hg manifold pressure. In that case coupling slips for various impact chamber pressure would be as indicated by line V of Fig. 28.

By injecting a mixture of water and alcohol into the fuel mixture in order to effect reduction of temperature by evaporation, the engine can operate at pressure around 80" Hg, without detonation. In that case the coupling slips for various impact chamber pressures would be as indicated by line XIII. Fig. 28, and that portion of the pick-up line VII leading from the lower end of line XIII and to the right thereof.

In order to provide for operation of the engine at the pressures indicated by lines XIII and VII of Fig. 28 certain changes in the throttle controller which has been described heretofore are necessary. These changes are shown in Figs. 31, 32 and 33. The pressure selecting cam 105 of Fig. 8 which provided for the selection of pressures no higher than about 62" Hg, is now capable of selecting pressures up to 80" Hg, for example, by virtue of the use of the bumper spring 304 in bellows 89 (Fig. 31). In order that parts of the controller shown in Fig. 8 may be used without change, it is necessary to add spring 304 which is inactive until after certain high pressure selections have been made such as 50". Spring 304 is located between the end wall 301 of a metal cap 300 and a self-locking nut 306 adjustable along a rod 305 fixed to bellows end plate 87. Cap 300 has a flange 302 confined between bellows end ring 91 and housing 2. For pressure selections ranging from the lowest to around 50" Hg the nut 306 is out of engagement with the spring 304. The nut 306 is located in the recess 95" corresponding to recess 95 of the controller shown in Fig. 8 and in communication with a pipe 99 (Fig. 33) which is connected with the engine induction pipe, for example at the scroll f (Fig. 1) of the supercharger F. Recess 95" is closed by a plug 95''' which, on being removed, provides access to the nut 306 so that it may be adjusted in order to determine at what engine intake pressure the spring 304 begins to exercise a control.

Lines A—B—C—D of Fig. 34 (on same sheet with Fig. 27) shows the relation of manifold pressures to positions of the main control lever 125 when the throttle controller is constructed as shown in Fig. 31. For pressure selections up to and including 50" the spring 304 is inactive; but, when the lever 125 is so moved that cam 105' selects pressures in excess of 50", the pressures which are obtained are designated by the line C—D which is substantially steeper than the portion B—C of the pressure line. At point C representing 50" the nut 306 has engaged the spring 304; therefore, after the manifold pressure exceeds 50" Hg, the bellows 89 is under the control of the spring 304. Since spring 304 is relatively stiff, the pressure will increase rapidly as indicated by line C—D when the lever 125 is moved passed the 50" pressure position. This makes it possible to go to the 80" pressure position without increasing the range of movement of lever 125. Fig. 18 shows a dial plate 128 with pressure marks up to 65". Fig. 33 shows a dial plate 128' with pressure graduations up to 80". The graduations from 25" to 50" inclusive are the same as the corresponding markings on dial 128; but the graduations 50" to 80" of dial 128' are relatively close together.

As stated before, the controller shown in Fig. 8 was designed for controlling the pressure of an engine capable of handling about 62" Hg, manifold pressure. That same engine can operate at pressure around 80" without detonation when a water and alcohol mixture is being injected with the liquid fuel into the induction passage. In order to protect the engine against operating at such high pressures when the water-alcohol mixture becomes exhausted, the controller shown in Fig. 31 provides a safety device in the form of a rod 339 whose end 350 projects normally into the path of movement of the lever 83 such a distance that, when the cam 105 is located for selecting pressures above 62" Hg, the lever 83 will be prevented from following the cam 105. When water injection is not used, the lever 83 cannot move to the left of the position which corresponds to the 62" Hg setting of the cam 105, although the cam 105 may be moved to a higher pressure selecting position. The rod 339 is controlled automatically by a fluid pressure means which will now be described. Instead of the back plate 8 shown in Fig. 8, we use a back plate 8" which is shaped to provide an annular recess 310 for receiving the edge of a diaphragm 311 confined between the back plate 8" and a housing 312 secured to the plate 8" by screws 313. A pipe 314 is attached to the plate 8" for the purposes of making a connection between a fluid pressure source and a recess 315 in plate 8", and a passage 316 connecting recess 315 with a chamber 317 in the housing 312. The diaphragm 311 is clamped between plates 318 and 319 which are confined between a shoulder 320 on a rod 322 and a nut 321 screw-threadedly engaging the rod 322. The rod 322 slides in a sleeve 323 supported by the plate 8"; and a spring 324 urges the diaphragm 311 toward the right, movement of the diaphragm being limited by the engagement of the nut 321 with a screw 325 threaded thru the housing 312 and secured in adjusted position by a self-locking, sealing nut 326.

The left end of rod 322 carries a pin 320 received by the bifurcated forked end 331 of a lever 331a attached to a shaft 332 which, as shown in Fig. 32, is journalled in a sleeve 332a carried by the back plate 8″. The lower end of lever 331a is provided with a forked portion 333 receiving a pin 334 attached to a lever 335 fixed to a screw stud shaft 336 journaled in a sleeve 336a carried by back plate 8″. The lower end 337 of the lever 335 carries a button 337a for engaging the head 338 or pressure disc of the rod 339. The rod 339 slides in a sleeve 340 carried by a boss 340a of the plate 8″. A spring 341 confined between the boss 340a and the head 338 urges the rod 339 toward the left, the head 338 engaging the button 337a of lever 337. This mechanism is enclosed in a chamber 342 provided by the back plate 8″ and closed by a cover plate 343 secured by screws 344 to plate 8″.

The chamber 317 at the right side of diaphragm 311, in Fig. 31, is adapted to receive the anti-detonant, a mixture of alcohol and water, which is conveyed from a main supply tank through pipe 314 to chamber 317 where it is maintained under sufficient pressure to move the diaphragm to the left as long as the supply of the anti-detonant is not exhausted. When the diaphragm is thus moved to the right, the rod 339 is positioned to permit the pressure to be stepped up to 80″ Hg but when the supply of anti-detonant under pressure is exhausted, the rod 339 is moved to the right to prevent the maintenance of a pressure higher than the maximum ordinarily obtainable, about 62″ Hg.

One specific form of device for controlling the supply of anti-detonant under pressure to the chamber 317 is shown in the co-pending application of Trisler et al., Serial No. 550,232, filed August 19, 1944, in which the supply of liquid under pressure in chamber 317 is dependent upon the actual flow of anti-detonant into the engine intake. The present invention is not limited to use of this mechanism, but any suitable means for supplying fluid under pressure to such chamber when the supply of anti-detonant is not exhausted may be employed.

Also it will be understood that the controller shown in Fig. 31 may be used with other systems which prevent engine detonation at high manifold pressures, when the system includes a fluid under pressure. For example, instead of being responsive to the existence of water-alcohol mixture under pressure, the diaphragm 311 could be responsive to the existence of a special fuel, the use of which enabled the engine to operate at high pressures without detonation or the diaphragm could be responsive to the existence of a special fuel cooling medium circulating to an intercooler or an aftercooler included in the engine fuel induction passage.

When, as the result of the proper functioning of means for enabling the engine to operate at high pressure without detonation, a certain liquid, such as alcohol-water mixture, in chamber 317 is placed under pressure, the diaphragm 318 will move to the left overcoming the pressure of spring 324 and will cause the lever 331a to rotate counterclockwise and the lever 335 clockwise, thereby permitting the spring 341 to move the rod 339 to the left so that its end 350 clears the lever 83 so that it can follow the cam 105 to its highest pressure selecting position. This will permit the controller to respond to a pressure selection as high as 80″ for example. When the supply of alcohol-water mixture becomes exhausted, the liquid in chamber 317 is no longer under full pressure and the diaphragm 311 is moved by the spring 324 to its normal position, and the end 350 of rod 349 is caused to move into engagement with the lever 83 to move it into such position that the maximum pressure that can be obtained is 62″ supercharger scroll pressure as indicated on Fig. 34.

In order that a pressure as high as 80″ Hg may be obtained in the intake manifold it is necessary to increase the speed of the auxiliary supercharger D (Fig. 1). This is obtained by decreasing the coupling slip or increasing the coupling ratio. In order that 80″ Hg pressure may be obtained at ground level or at about 30″ Hg carburetor impact chamber pressure, the coupling slip is reduced to about 31% which is the starting point of the line XIII (Fig. 28). As altitude increases to about that which corresponds to impact chamber pressure 24″ Hg, the full 80″ manifold pressure can be maintained without detonation. At higher altitudes corresponding to impact chamber pressures less than 24″ Hg, the engine can not be operated without detonation at 80″ Hg. Under these conditions there is no need for operating the auxiliary supercharger at a speed which will give manifold pressure in excess of what can be safely used; therefore the slip of the hydraulic coupling is automatically controlled according to the pick-up line VII (Fig. 28) as has been explained heretofore. This causes the pressure of 80″ which could be maintained, when the impact chamber pressure is 24″, to be gradually reduced, for example to be reduced to 55″, at an altitude corresponding to which the impact chamber pressure is about 12½″ Hg.

In order to make the hydraulic-coupling operate in this manner, we substitute for the lever 232, Fig. 18, a lever 232′ (Fig. 33), having a cam 231′ engaged by roller 230′ on arm 116′ which is the equivalent of arm 116, of Fig. 18. The contour of cam 231′ is defined by parts a—b, b—c, and c—d, as shown in Fig 33. The part a—b corresponds to pressure line A—B of Fig. 34, the part b—c corresponds to the pressure line B—C, and the part c—d corresponds to the pressure line C—D of Fig. 34. Regardless of whether water injection is used, the cam part a—b—c can follow the roller 230′ as it moves counterclockwise, while arm 117′ is moving to carry its pointer 126′ as far as the 50″ mark on the dial 128′. As the arm 117′ moves further counterclockwise and its pointer 126′ arrives at the 62″ graduation the roller 230′ is engaging a part of the cam portion c—d. By that time the lever 232′ will have been moved up under the action of spring 227 (Fig. 20). Then lever 232′ starts to engage the lower end of a stop screw 352 carried by lever 351 attached to shaft 332. Since clockwise movement of lever 232′ is arrested, counterclockwise rotation of lever 228 (Fig. 20) under the action of spring 227 ceases, said levers being connected by link 235′ corresponding to link 235 of Fig. 20. The lever 232′ can move upwardly no further until there is fluid in chamber 317 under sufficient pressure to move the rod 339 away from the lever 83 for the purpose described. In other words, when there is no water-alcohol mixture flowing into the induction pipe, the auxiliary supercharger cannot be operated fast enough to obtain a pressure exceeding 62″ Hg; but, when the alcohol-water mixture is flowing out the fuel nozzle, then the pressure in the chamber 317 is sufficient to cause full movement of the diaphragm 311 toward the left so as to retract the rod end 350 from the lever 83 and retract the stop screw 352 from the lever 232' so that all of the cam portion c—d of cam 231' can follow the roller 230' when it is moved into positions corresponding to movement of cam 105' into the higher range of pressure selecting positions as indicated by movement of the pointer 126' to positions between 62" and 80" on the dial 128'. When such clockwise movement of the lever 232' is possible, spring 227 (Fig. 20) is permitted to cause the lever 228 and the axis 211 of cam 210 to be rotated counterclockwise about the axis of shaft 212 to the left of $V_{211}$ (Fig. 27) and other parts are moved accordingly in order to give a ground level coupling slip about 31%; and the hydraulic coupling will function according to lines XIII and VII of Fig. 28. Proper coordination of the levers 351 and 232' is effected by adjusting the screw 352 which is held in the desired position of adjustment by a lock nut 353 and a lock washer 354.

It will be understood that the modified throttle controller shown in Figs. 31, 32 and 33 can be coordinated with the hydraulic coupling controller described heretofore regardless of use of water injection. If there is no pressure in the diaphragm chamber 317, the controller shown in Fig. 31 cooperates with the hydraulic coupling controller to effect its operation according to line IV of Fig. 28, assuming that the engine intake pressure does not exceed 60" Hg and the supercharger scroll pressure 62". Operation of the hydraulic coupling controller according to lines XIII and VII of Fig. 28, occurs only when there is a fluid pressure in the chamber 317 sufficient to overcome the spring 324 as the result of the proper functioning of the alcohol-water injection system. When this system ceases to function the throttle control and its coordinated hydraulic coupling controller are conditioned automatically to provide engine intake pressure no greater than 60" Hg.

While the embodiments of the present invention as herein disclosed, constitute preferred forms, it is to be understood that other forms might be adopted, all coming within the scope of the claims which follow.

What is claimed is as follows:

1. Control apparatus for a supercharged internal combustion engine which drives a supercharger through a variable speed transmission comprising, in combination, a movable element for controlling the speed ratio of the transmission, a servo-motor for operating the element, a servo-motor control member, apparatus responsive to altitude pressure changes for so positioning the member as to effect a movement of the element and a device responsive to movement of the element for so positioning the member as to stop movement of the element when a certain relation between altitude-pressure and speed ratio has been established.

2. Control apparatus for a supercharged internal combustion engine which drives a supercharger through a variable speed transmission comprising, in combination, a movable element for controlling the speed ratio of the transmission a servo-motor for operating the element, a servo-motor control member, apparatus responsive to altitude-pressure decrease for so positioning the member as to effect a movement of the element for increasing the speed ratio of the transmission and a device responsive to movement of the element for so positioning the member as to stop movement of the element when a certain relation between altitude-pressure and speed ratio has been established.

3. Control apparatus for a supercharged internal combustion engine which drives a supercharger through a variable speed transmission comprising, in combination, a movable element for controlling the speed ratio of the transmission, a servo-motor for operating the element, means for controlling the servo-motor including a control member, apparatus responsive to altitude-pressure decrease for so positioning the member as to effect a movement of the element for increasing the speed ratio of the transmission and a device responsive to movement of the element for so positioning the member as to stop movement of the element when a certain relation between altitude-pressure and speed ratio has been established according to a schedule suitable for part load operation of the engine; and manually controlled means for so modifying the servo-motor control means as to increase the values of the speed ratios for various altitude-pressures when it is desired to increase the engine power output.

4. Control apparatus for a supercharged internal combustion engine which drives a supercharger through a variable speed transmission comprising, in combination, a movable element for controlling the speed ratio of the transmission, a servo-motor for operating the element, means for controlling the servo-motor including a member, apparatus responsive to altitude-pressure decrease for so positioning the member as to effect a movement of the element for increasing the speed ratio of the transmission device and a device responsive to movement of the element for so positioning the member as to stop movement of the element when a certain relation between altitude-pressure and speed ratio has been established according to a schedule suitable for part load operation of the engine; manually controlled means for so modifying the servo-motor control means as to increase the values of the speed ratios for various altitude-pressures when it is desired to increase the engine power output and means for effecting a decrease in the rate of speed-ratio increase relative to altitude pressure decrease after a certain altitude-pressure is obtained.

5. Control apparatus for a supercharged internal combustion engine which drives a supercharger through a variable speed transmission comprising, in combination, a movable element for controlling the speed ratio of the transmission, a servo-motor for operating the element, means for controlling the servo-motor including a member, apparatus responsive to altitude pressure decrease for so positioning the member as to effect a movement of the element for increasing the speed ratio of the transmission and a device responsive to movement of the element for so positioning the member as to stop movement of the element when a certain relation between altitude-pressure and speed ratio has been established according to a schedule suitable for part load operation of the engine; means for controlling the engine throttle valve so as to maintain a selected pressure with changing altitude and having a device for selecting the pressure to be maintained, a manually operated control member for adjusting the pressure selecting device, and means operating in response to movement of the manually operated control member for so modifying the servo-motor control means as to increase the values of the speed ratios for various altitude-pressures when the selected pressure is increased.

6. Control apparatus for a supercharged internal combustion engine which drives a supercharger through a variable speed transmission comprising, in combination, a movable element for controlling the speed ratio of the transmission, a servo-motor for operating the element, means for controlling the servo-motor including a member, apparatus responsive to altitude-pressure decrease for so positioning the member as to effect a movement of the element for increasing the speed ratio of the transmission, and a device responsive to movement of the element for so positioning the member as to stop movement of the element when a certain relation between altitude-pressure and speed ratio has been established according to a schedule suitable for part load operation of the engine; means for controlling the engine throttle valve so as to maintain a selected pressure with changing altitude and having a device for selecting the pressure to be maintained, a manually operated control member for adjusting the pressure selecting device, means operating in response to movement of the manually operated control member for so modifying the servo-motor control means as to increase the values of the speed ratios for various altitude-pressures when the selected pressure is increased and means for effecting a decrease in the rate of speed-ratio increase relative to altitude-pressure decrease after a certain altitude-pressure is obtained.

7. Control apparatus for a supercharged internal combustion engine which drives a supercharger through a variable speed transmission comprising, in combination, a movable element for controlling the speed ratio of the transmission, a servo-motor for operating the element, means for controlling the servo-motor including a member, apparatus responsive to altitude-pressure decrease for so positioning the member as to effect a movement of the element for increasing the speed ratio of the transmission and a device responsive to movement of the element for so positioning the member as to stop movement of the element when a certain relation between altitude-pressure and speed ratio has been established according to a schedule suitable for part load operation of the engine; manually controlled means for so modifying the servo-motor control means as to increase the values of the speed ratios for various altitude-pressures when it is desired to increase the engine power output, and means operated during movement of the transmission control element from a certain position to increase the speed-ratio for causing the speed ratio to increase at a reduced rate relative to altitude-pressure decrease.

8. Control apparatus for a supercharged internal combustion engine which drives a supercharger through a variable speed transmission comprising, in combination, a movable element for controlling the speed ratio of the transmission, a servo-motor for operating the element, means for controlling the servo-motor including a member, apparatus responsive to altitude-pressure decrease for so positioning the member as to effect a movement of the element for increasing the speed ratio of the transmission and a device responsive to movement of the element for so positioning the member as to stop movement of the element when a certain relation between altitude-pressure and speed ratio has been established according to a schedule suitable for part load operation of the engine; means for controlling the engine throttle valve so as to maintain a selected pressure with changing altitude and having a device for selecting the pressure to be maintained, a manually operated control member for adjusting the pressure selecting device, means operating in response to movement of the manually operated control member for so modifying the servo-motor control means as to increase values of the speed ratios for various altitude-pressures when the selected pressure is increased and means operated during movement of the transmission control element from a certain position to increase the speed-ratio for causing the speed ratio to increase at a reduced rate relative to altitude-pressure decrease.

9. Control apparatus for supercharged internal combustion engines which drives a supercharger through a variable speed transmission comprising, in combination, a movable element for controlling the speed ratio of the transmission; a servo-motor for operating the element, means for controlling the servo-motor including a lever, a bellows responsive to altitude change for so positioning the lever as to effect a movement of the element and a cam engaged by the lever and operated by the servo-motor for so positioning the lever as to stop movement of the element when a certain relation between altitude and speed ratio has been established.

10. Control apparatus for supercharged internal combustion engines which drives a supercharger through a variable speed transmission comprising, in combination, a movable element for controlling the speed ratio of the transmission; a servo-motor for operating the element, means for controlling the servo-motor including a lever, a bellows responsive to altitude increase for so positioning the lever as to effect a movement of the element for increasing the speed ratio of the transmission and a cam engaged by the lever and operated by the servo-motor for so positioning the lever as to stop movement of the element when a certain relation between altitude and speed ratio has been established.

11. Control apparatus for supercharged internal combustion engines which drives a supercharger through a variable speed transmission comprising, in combination, a movable element for controlling the speed ratio of the transmission, a servo-motor for operating the element, means for controlling the servo-motor including a lever, a bellows responsive to altitude increase for so positioning the lever as to effect a movement of the element for increasing the speed ratio of the transmission and a cam engaged by the lever and operated by the servo-motor for so positioning the lever as to stop movement of the element when a certain relation between altitude and speed ratio has been established according to a schedule suitable for part load operation of the engine; and manually controlled means for shifting the cam in a direction such as to increase the values of the speed ratios for various altitude-pressures when it is desired to increase the engine power output.

12. Control apparatus for supercharged internal combustion engines which drives a supercharger through a variable speed transmission comprising, in combination, a movable element for controlling the speed ratio of the transmission, a servo-motor for operating the element, means for controlling the servo-motor including a lever, a bellows responsive to altitude increase for so positioning the lever as to effect a movement of the element for increasing the speed ratio of the transmission device and a cam engaged by the lever and operated by the servo-motor for so positioning the lever as to stop movement of the element when a certain relation between altitude and speed ratio has been established according to a schedule suitable for part load operation of the engine; manually controlled means for shifting the cam in a direction such as to increase the values of the speed ratios for various altitude-pressures when it is desired to increase the engine power output, and means for shifting the cam in the opposite direction to effect a decrease in the rate of speed ratio increase relative to altitude-pressure decrease after a certain altitude is obtained.

13. Control apparatus for supercharged internal combustion engines which drives a supercharger through a variable speed transmission comprising, in combination, a movable element for controlling the speed ratio of the transmission, a servo-motor for operating the element, means for controlling the servo-motor including a lever, a bellows responsive to altitude increase for so positioning the lever as to effect a movement of the element for increasing the speed ratio of the transmission and a cam engaged by the lever and operated by the servo-motor for so positioning the lever as to stop movement of the element when a certain relation between altitude and speed ratio has been established according to a schedule suitable for part load operation of the engine; means for controlling the engine throttle valve so as to maintain a selected pressure with changing altitude and having a device for selecting the pressure to be maintained, a manually operated control member for adjustable the pressure selecting device, and means operating in response to movement of the manually operated control member for shifting the cam in a direction such as to increase the values of the speed-ratios for various altitude-pressures when the selected pressure is increased.

14. A control apparatus for supercharged internal combustion engines which drives a supercharger through a variable speed transmission comprising, in combination, a movable element for controlling the speed ratio of the transmission, a servo-motor for operating the element, means for controlling the servo-motor including a lever, a bellows responsive to altitude increase for so positioning the lever as to effect a movement of the element for increasing the speed ratio of the transmission and a cam engaged by the lever and operated by the servo-motor for so positioning the lever as to stop movement of the element when a certain relation between altitude and speed ratio has been established according to a schedule suitable for part load operation of the engine; means for controlling the engine throttle valve so as to maintain a selected pressure with changing altitude and having a device for selecting the pressure to be maintained, a manually operated control member for adjusting the pressure selecting device, means operating in response to movement of the manually operated control member for shifting the cam in a direction such as to increase the values of the speed-ratios for various altitude-pressures when the selected pressure is increased, and means for shifting the cam in the opposite direction to effect a decrease in the rate of speed-ratio increase relative to altitude-pressure decrease after a certain altitude-pressure is obtained.

15. Control apparatus for supercharged internal combustion engines which drives a supercharger through a variable speed transmission comprising, in combination, a movable element for controlling the speed ratio of the transmission, a servo-motor for operating the element, means for controlling the servo-motor including a lever, a bellows responsive to altitude increase for so positioning the lever as to effect a movement of the element for increasing the speed ratio of the transmission and a cam engaged by the lever and operated by the servo-motor for so positioning the lever as to stop movement of the element when a certain relation between altitude and speed ratio has been established according to a schedule suitable for part load operation of the engine; manually controlled means for shifting the cam in a direction such as to increase the values of the speed ratios for various altitude-pressures when it is desired to increase the engine power output, and means operated by the servo-motor while moving the transmission control element from a certain position to increase the speed-ratio for causing the speed ratio to increase at a reduced rate relative to altitude-pressure decrease.

16. Control apparatus for supercharged internal combustion engines which drives a supercharger through a variable speed transmission comprising, in combination, a movable element for controlling the speed ratio of the transmission, a servo-motor for operating the element, means for controlling the servo-motor including a lever, a bellows responsive to altitude increase for so positioning the lever as to effect a movement of the element for increasing the speed ratio of the transmission and a cam engaged by the lever and operated by the servo-motor for so positioning the lever as to stop movement of the element when a certain relation between altitude and speed ratio has been established according to a schedule suitable for part load operation of the engine; means for controlling the engine throttle valve so as to maintain a selected pressure with changing altitude and having a device for selecting the pressure to be maintained, a manually operated control member for adjusting the pressure selecting device, means operating in response to movement of the manually operated control member for shifting the cam in a direction such as to increase the values of the speed-ratios for various altitude-pressures when the selected pressure is increased, and means operated by the servo-motor while moving the transmission control element from a certain position to increase the speed-ratio for causing the speed ratio to increase at a reduced rate relative to altitude-pressure decrease.

17. Control apparatus for supercharged internal combustion engines which drives a supercharger through a variable speed transmission comprising, in combination, a movable element for controlling the speed ratio of the transmission, a servo-motor for operating the element, means for controlling the servo-motor including a lever, a bellows responsive to altitude increase for so positioning the lever as to effect a movement of the element for increasing the speed ratio of the transmission and a rotary cam engaged by the lever and operated by the servo-motor for so positioning the lever as to stop movement of the element when a certain relation between altitude and speed ratio has been established according to a schedule suitable for part load operation of the engine; a shaft eccentrically supporting the axis of the cam, and manually controlled means for rotating said shaft in a direction such as to increase the values of the speed ratios for various altitude-pressures when it is desired to increase the engine power output.

18. Control apparatus for supercharged internal combustion engines which drives a supercharger through a variable speed transmission comprising, in combination, a movable element for controlling the speed ratio of the transmission, a servo-motor for operating the element, means for controlling the servo-motor including a lever, a bellows responsive to altitude increase for so positioning the lever as to effect a movement of the element for increasing the speed ratio of the transmission and a rotary cam engaged by the lever and operated by the servo-motor for so positioning the lever as to stop movement of the element when a certain relation between altitude and speed ratio has been established according to a schedule suitable for part load operation of the engine; a shaft eccentrically supporting the axis of the cam, manually controlled means for rotating said shaft in a direction such as to increase the values of the speed ratios for various altitude-pressures when it is desired to increase the engine power output, and means for rotating the shaft in the opposite direction to effect a decrease in the rate of speed-ratio increase relative to altitude-pressure decrease after a certain altitude-pressure is obtained.

19. Control apparatus for supercharged internal combustion engines which drives a supercharger through a variable speed transmission comprising, in combination, a movable element for controlling the speed ratio of the transmission; a servo-motor for operating the element, means for controlling the servo-motor including a lever, a bellows responsive to altitude increase for so positioning the lever as to effect a movement of the element for increasing the speed ratio of the transmission and a rotary cam engaged by the lever and operated by the servo-motor for so positioning the lever as to stop movement of the element when a certain relation between altitude and speed ratio has been established according to a schedule suitable for part load operation of the engine; a shaft eccentrically supporting the axis of the cam, means for controlling the engine throttle valve so as to maintain a selected pressure with changing altitude and having a device for selecting the pressure to be maintained, a manually operated control member for adjusting the pressure selecting device, and means operating in response to movement of the manually operated control member for rotating the cam in a direction such as to increase the values of the speed ratios for various altitude-pressures when the selected pressure is increased.

20. Control apparatus for supercharged internal combustion engines which drives a supercharger through a variable speed transmission comprising, in combination, a movable element for controlling the speed ratio of the transmission, a servo-motor for operating the element, means for controlling the servo-motor including a lever, a bellows responsive to altitude increase for so positioning the lever as to effect a movement of the element for increasing the speed ratio of the transmission and a rotary cam engaged by the lever and operated by the servo-motor for so positioning the lever as to stop movement of the element when a certain relation between altitude and speed ratio has been established according to a schedule suitable for part load operation of the engine; a shaft eccentrically supporting the axis of the cam, means for controlling the engine throttle valve so as to maintain a selected pressure with changing altitude and having a device for selecting the pressure to be maintained, a manually operated control member for adjusting the pressure selecting device, means operating in response to movement of the manually operated control member for rotating the shaft in a direction such as to increase the values of the speed-ratios for various altitude-pressures when the selected pressure is increased, and means for rotating the shaft in the opposite direction to effect a decrease in the rate of speed ratio increase relative to altitude-pressure decrease after a certain altitude-pressure is obtained.

21. Control apparatus for supercharged internal combustion engines which drives a supercharger through a variable speed transmission comprising, in combination, a movable element for controlling the speed ratio of the transmission; a servo-motor for operating the element, means for controlling the servo-motor including a lever, a bellows responsive to altitude increase for so positioning the lever as to effect a movement of the element for increasing the speed ratio of the transmission and a rotary cam engaged by the lever and operated by the servo-motor for so positioning the lever as to stop movement of the element when a certain relation between altitude and speed ratio has been established according to a schedule suitable for part load operation of the engine; a shaft eccentrically supporting the axis of the cam, manually controlled means for rotating said shaft in a direction such as to increase the values of the speed ratios for various altitude-pressures when it is desired to increase the engine power output, and means operated by the servo-motor while moving the transmission control element from a certain position to increase the speed-ratio for rotating the shaft in the opposite direction to effect a decrease in the rate of speed-ratio increase relative to altitude-pressure decrease.

22. Control apparatus for supercharged internal combustion engines which drives a supercharger through a variable speed transmission comprising, in combination, a movable element for controlling the speed ratio of the transmission, a servo-motor for operating the element, means for controlling the servo-motor including a lever, a bellows responsive to altitude increase for so positioning the lever as to effect a movement of the element for increasing the speed ratio of the transmission and a rotary cam engaged by the lever and operated by the servo-motor for so positioning the lever as to stop movement of the element when a certain relation between altitude and speed ratio has been established according to a schedule suitable for part load operation of the engine; a shaft eccentrically supporting the axis of the cam, means for controlling the engine throttle valve so as to maintain a selected pressure with changing altitude and having a device for selecting the pressure to be maintained, a manually operated control member for adjusting the pressure selecting device, means operating in response to movement of the manually operated control member for rotating the shaft in a direction such as to increase the values of the speed-ratios for various altitude-pressures when the selected pressure is increased, and means operated by the servo-motor while moving the transmission control element from a certain position to increase the speed-ratio for rotating the shaft in the opposite direction to effect a decrease in the rate of speed-ratio increase relative to altitude-pressure decrease.

23. Control apparatus for supercharged internal combustion engines which drives a supercharger through a variable speed transmission comprising, in combination, a movable element for controlling the speed ratio of the transmission; a servo-motor for operating the element, means for controlling the servo-motor including a lever, a bellows responsive to altitude increase for so positioning the lever as to effect a movement of the element for increasing the speed ratio of the transmission and a rotary cam engaged by the lever and operated by the servo-motor for so positioning the lever as to stop movement of the element when a certain relation between altitude and speed ratio has been established according to a schedule suitable for part load operation of the engine; a shaft eccentrically supporting the axis of the cam, a spring for actuating the shaft in a direction such as to increase the values of the speed-ratios for various altitude pressures, a lever actuated by the spring and connected with the shaft and providing a cam surface, a manually positioned cam follower engaged by the cam surface by operation of said spring, the location of the cam follower determining the extent of spring-operated movement of said shaft, and means for rotating the shaft in the opposite direction to the action of said spring, said means being operated by the servo-motor while moving the transmission control element from a certain position to increase the speed ratio, thereby effecting a decrease in the rate of speed ratio increase relative to altitude-pressure decrease.

24. Control apparatus for supercharged internal combustion engines which drives a supercharger through a variable speed transmission comprising, in combination, a movable element for controlling the speed ratio of the transmission, a servo-motor for operating the element, means for controlling the servo-motor including a lever, a bellows responsive to altitude increase for so positioning the lever as to effect a movement of the element for increasing the speed ratio of the transmission and a rotary cam engaged by the lever and operated by the servo-motor for so positioning the lever as to stop movement of the element when a certain relation between altitude and speed ratio has been established according to a schedule suitable for part load operation of the engine; a shaft eccentrically supporting the axis of the cam, means for controlling the engine throttle valve so as to maintain a selected pressure with changing altitude and having a device for selecting the pressure to be maintained. a manually operated control member for adjusting the pressure selecting device. a spring for actuating the shaft in a direction such as to increase the values of the speed-ratios for various altitude pressures, a lever actuated by the spring and connected with the shaft and providing a cam surface, a cam-follower positioned in response to movement of the manually operated control member, said cam follower being engaged by the cam surface by operation of said spring. the location of the cam follower determining the extent of spring-operated movement of said shaft, and means for rotating the shaft in the opposite direction in opposition to the action of said spring, said means being operated by the servo-motor while moving the transmission control element from a certain position to increase the speed-ratio, thereby effecting a decrease in the rate of speed ratio increase relative to altitude-pressure decrease.

25. Control apparatus for a supercharged internal combustion engine comprising, in combination, a throttle valve for controlling engine intake pressure, a throttle valve controller comprising a servo-motor, a manually operable member, a mechanism under the control of the manually operable member for effecting a partial opening of the throttle and under the control of the servo-motor for effecting that additional opening of the throttle required to maintain a selected intake-pressure, means for controlling the servo-motor including a device responsive to intake pressure and including a pressure selecting element under the control of the manually operable member; means normally operative to limit the control by the pressure selecting element to that of obtaining a pressure less than the highest of which it is capable; and a fluid pressure actuated apparatus for rendering the limiting means ineffective.

26. Control apparatus for a supercharged internal combustion engine comprising, in combination, a throttle valve for controlling engine intake pressure, a throttle valve controller comprising a servo-motor, a manually operable member, a mechanism under the control of the manually operable member for effecting a partial opening of the throttle and under the control of the servo-motor for effecting that additional opening of the throttle required to maintain a selected intake-pressure, means for controlling the servo-motor including a pressure-selecting cam positioned by the manually operated member, a cam follower lever, a spring urging the lever against the cam and a device responsive to intake pressure for positioning the lever; means normally operative to stop the lever from following the cam when the cam is in certain high pressure selecting positions; and a fluid pressure actuated apparatus for rendering inoperative the lever stopping means.

27. Control apparatus for a supercharged internal combustion engine comprising, in combination, a throttle valve for controlling engine intake pressure, a throttle valve controller comprising a servo-motor, a manually operable member. a mechanism under the control of the manually operable member for effecting a partial opening of the throttle and under the control of the servo-motor for effecting that additional opening of the throttle required to maintain a selected intake-pressure, means for controlling the servo-motor including a device responsive to intake pressure and including a pressure selecting element under the control of the manually operable member; a controller for a variable speed transmission for driving a supercharger, said controller comprising a movable control element, a servo-motor for operating the element, servo-motor control means responsive to altitude-pressure change and to movement of the element for effecting a predetermined schedule of speed-ratios for various altitude-pressures suitable for part load operation of the engine. means under the control of the manually operable member for modfving the servo-motor control means of the transmission controller in order to obtain higher speed ratios when higher pressures are selected to be maintained by the throttle valve controller, whereby the supercharging action is increased to meet the demand for increased engine power output; means normally operative so to limit the action of the throttle controller to that of effecting pressures less than the highest of which the throttle controller is capable of effecting, and so to limit the action of the transmission controller to that of effecting speed-ratios less than the greatest of which the controller is capable of effecting; and a fluid-pressure actuated apparatus for rendering the limiting means inoperative.

28. Control apparatus for a supercharged internal combustion engine comprising, in combination, a throttle valve for controlling engine intake pressure, a throttle valve controller comprising a servo-motor, a manually operable member, a mechanism under the control of the manually operable member for effecting a partial opening of the throttle and under the control of the servo-motor for effecting that additional opening of the throttle required to maintain a selected intake-pressure, means for controlling the servo-motor including a pressure-selecting cam positioned by the manually operated member, a cam follower lever, a spring urging the lever against the cam and a device responsive to intake pressure for positioning the lever; a controller for a variable speed transmission for driving a supercharger, said controller comprising a movable control element, a servo-motor for operating the element, servo-motor control means responsive to altitude-pressure change and to movement of the element for effecting a predetermined schedule of speed-ratios for various altitude-pressures suitable for part load operation of the engine, means under the control of the manually operable member for modifying the servo-motor control means of the transmission controller in order to obtain higher speed ratios when higher pressures are selected to be maintained by the throttle valve controller, whereby the supercharging action is increased to meet the demand for increased engine power output; said modifying means including a cam follower positioned by the manually operable member, a lever having a cam surface engageable with the cam follower, a spring for urging the lever against the cam follower; means normally operative to stop the two levers from following their respective cams when the manually operable member is in certain high pressure selecting positions; and a fluid-pressure actuated apparatus for retracting the lever stopping means.

29. Control apparatus for a supercharged internal combustion engine comprising, in combination, a throttle valve for controlling engine intake pressure, a throttle valve controller comprising a servo-motor, a manually operable member, a mechanism under the control of the manually operable member for effecting a partial opening of the throttle and under the control of the servo-motor for effecting that additional opening of the throttle required to maintain a selected intake-pressure, means for controlling the servo-motor including a device responsive to intake pressure and including a pressure selecting element under the control of the manually operable member; a controller for a variable-speed transmission for driving a supercharger, said controller comprising movable control element, a servo-motor for operating the element, servo-motor control means responsive to altitude-pressure change and to movement of the element for effecting a predetermined schedule of speed-ratios for various altitude-pressures suitable for part load operation of the engine; means under the control of the manually operable member for modifying the servo-motor control means of the transmission controller in order to obtain higher speed ratios when higher pressures are selected to be maintained by the throttle valve controller, whereby the supercharging action is increased to meet the demand for increased engine power output; means normally operative so to limit the action of the throttle controller to that of effecting pressures less than the highest of which the throttle controller is capable of effecting, and so to limit the action of the transmission controller to that of effecting speed-ratios less than the greatest of which the controller is capable of effecting; a fluid-pressure actuated apparatus for rendering the limiting means inoperative and means operating at various altitudes for limiting the transmission speed-ratios to values such that engine intake-pressures are restricted to values safe for engine operation.

30. Control apparatus for a supercharged internal combustion engine comprising, in combination, a throttle valve for controlling engine intake pressure, a throttle valve controller comprising a servo-motor, a manually operable member, a mechanism under the control of the manually operable member for effecting a partial opening of the throttle and under the control of the servo-motor for effecting that additional opening of the throttle required to maintain a selected intake-pressure, means for controlling the servo-motor including a pressure-selecting cam positioned by the manually operated member, a cam follower lever, a spring urging the lever against the cam and a device responsive to intake pressure for positioning the lever; a controller for a variable speed transmission for driving a supercharger, said controller comprising movable control element, a servo-motor for operating the element, servo-motor control means responsive to altitude-pressure change and to movement of the element for effecting a predetermined schedule of speed-ratios for various altitude-pressures suitable for part load operation of the engine, means under the control of the manually operable member for modifying the servo-motor control means of the transmission controller in order to obtain higher speed ratios when higher pressures are selected to be maintained by the throttle-valve controller, whereby the supercharging action is increased to meet the demand for increased engine power output; said modifying means including a cam follower positioned by the manually operable member, a lever having a cam surface engageable with the cam follower, a spring for urging the lever against the cam follower; means normally operative to stop the two levers from following their respective cams when the manually operable member is in certain high pressure selecting positions; a fluid-pressure actuated apparatus for retracting the lever stopping means and means operating at various altitudes for limiting the transmission speed-ratios to values such that engine intake-pressures are restricted to values safe for engine operation.

31. Control apparatus for a supercharged internal combustion engine comprising the combination of a throttle controller having a manually controlled pressure selecting device, a device responsive to engine intake pressure and means under the control of said devices for adjusting the throttle in order to maintain a selected pressure with changing altitude; a controller for a variable speed transmission for driving a supercharger having means for obtaining increasing speed-ratios with increasing altitudes according to a predetermined normal schedule suitable for part-load operation of the engine; and means coordinated with the pressure selecting device of the throttle controller for adjusting the transmission controller for obtaining higher speed ratios corresponding to various altitudes when higher pressures are selected for the purpose of obtaining greater engine intake pressures required for greater engine power output.

32. Control apparatus according to claim 31 further characterized by the provision of means operated by the transmission controller for effecting a modification of the adjustment of the transmission controller (coordinated with the throttle controller) in order to prevent the rise of engine intake pressure to a value causing detonation.

33. Control apparatus according to claim 31 further characterized by the provision of means normally effective to limit the intake-pressure obtainable by operation of the throttle controller to a value less than the maximum which the throttle controller is capable of obtaining and to limit the extent of modification of the transmission controller in coordination with the pressure selecting device whereby limitation of transmission speed is commensurate with the limitation of intake-pressure; and means operated by fluid pressure for rendering the limiting means inoperative.

34. Control apparatus according to claim 31 further characterized by the provision of means normally effective to limit the intake-pressure obtainable by operation of the throttle controller to a value less than the maximum which the throttle controller is capable of obtaining and to limit the extent of modification of the transmission controller in coordination with the pressure selecting device whereby limitation of transmission speed is commensurate with the limitation of intake-pressure; and means operated by fluid pressure for rendering the limiting means inoperative; and said control apparatus being further characterized by the provision of means operated by the transmission controller for effecting a modification of the adjustment of the transmission controller (coordinated with the throttle controller) in order to prevent the rise of engine intake pressure to a value causing detonation.

35. Control apparatus for a supercharged internal combustion engine comprising the combination of a throttle controller having a manually controlled pressure selecting device, a device responsive to engine intake pressure, and means under the control of said devices for adjusting the throttle in order to maintain a selected pressure with changing altitude; means normally effective to limit the intake-pressure obtainable by operation of the controller to a value less than the maximum which the throttle controller is capable of obtaining; and means operated by fluid pressure for rendering the limiting means inoperative.

36. Control apparatus for controlling the pressure maintained in the fuel mixture intake of a supercharged internal combustion engine in which means are provided for injecting an anti-detonant into said intake when pressures above a predetermined maximum are desired, said apparatus including an adjustable pressure selecting means for selecting the pressure to be maintained, said pressure selecting means being adjustable throughout a normal range to select pressures up to said predetermined maximum and beyond the normal range to select pressures above said predetermined maximum, and means responsive to the pressure of the anti-detonant to control the pressure obtainable and effective when there is no supply of anti-detonant to limit the pressure obtainable to said predetermined maximum.

37. Control apparatus for controlling the pressure maintained in the fuel mixture intake of a supercharged internal combustion engine in which means are provided for injecting an anti-detonant into said intake when pressures above a predetermined maximum are desired, said apparatus including an adjustable pressure selecting means for selecting the pressure to be maintained, said pressure selecting means being adjustable throughout a normal range to select pressures up to said predetermined maximum and beyond the normal range to select pressures above said predetermined maximum, and means responsive to the pressure of the anti-detonant and operative, when the supply of anti-detonant fails, to override the adjustable pressure selecting means if said means is adjusted to select a pressure higher than said predetermined maximum, so as to prevent any pressure higher than predetermined maximum being obtained.

38. Control apparatus for controlling the pressure maintained in the fuel mixture intake of a supercharged internal combustion engine in which means are provided for injecting an anti-detonant into said intake when pressures above a predetermined maximum are desired, said apparatus including an adjustable pressure selecting means for selecting the pressure to be maintained, said pressure selecting means being adjustable throughout a normal range to select pressures up to said predetermined maximum and beyond the normal range to select pressures above said predetermined maximum, a control member cooperating with and operable in response to movement of said pressure selecting means, means controlled by movement of said member and operative to obtain the pressure selected, means responsive to the pressure of the anti-detonant to control the movement of said member and effective when there is no supply of anti-detonant to prevent any movement of said member when the selecting means is adjusted to select a pressure higher than said predetermined maximum so that no pressure higher than said maximum can be obtained if there is no supply of anti-detonant.

39. Control apparatus for controlling the pressure maintained in the fuel mixture intake of a supercharged internal combustion engine in which means are provided for injecting an anti-detonant into said intake when pressures above a predetermined maximum are desired, said apparatus including an adjustable pressure selecting means for selecting the pressure to be maintained, said pressure selecting means being adjustable throughout a normal range to select pressures up to said predetermined maximum and beyond the normal range to select pressures above said predetermined maximum, a control member cooperating with and operable in response to movement of said pressure selecting means, means controlled by movement of said member and operative to obtain the pressure selected, means responsive to the pressure of the anti-detonant and operative when the supply of anti-detonant fails to override the pressure selecting means and prevent any movement of said control member when the pressure selecting means is adjusted to select a pressure higher than said predetermined maximum.

JOHN DOLZA.
ARTHUR W. GAUBATZ.
PETER W. PERISH.
FRANK W. KERFOOT.

REFERENCES CITED

The following references are of record in the file of this patent:

UNITED STATES PATENTS

| Number | Name | Date |
|---|---|---|
| 2,217,364 | Halford et al. | Oct. 8, 1940 |
| 2,228,239 | Ammann | Jan. 14, 1941 |
| 2,285,344 | Marples | June 2, 1942 |

FOREIGN PATENTS

| Number | Country | Date |
|---|---|---|
| 356,410 | Great Britain | Sept. 10, 1931 |
| 548,778 | Great Britain | Oct. 23, 1942 |